US010104697B2

United States Patent
Niddam et al.

(10) Patent No.: US 10,104,697 B2
(45) Date of Patent: *Oct. 16, 2018

(54) METHOD FOR DYNAMICALLY ADAPTING THE CAPACITY OF A CONTENTION TRANSMISSION CHANNEL

(71) Applicant: THALES, Courbevoie (FR)

(72) Inventors: David Niddam, Toulouse (FR); Mathieu Gineste, Toulouse (FR); Cécile Faure, Toulouse (FR); Isabelle Ulpat, Toulouse (FR)

(73) Assignee: THALES, Courbevoie (FR)

( * ) Notice: Subject to any disclaimer, the term of this patent is extended or adjusted under 35 U.S.C. 154(b) by 75 days.

This patent is subject to a terminal disclaimer.

(21) Appl. No.: 15/269,679

(22) Filed: Sep. 19, 2016

(65) Prior Publication Data
US 2017/0099683 A1    Apr. 6, 2017

(30) Foreign Application Priority Data

Oct. 2, 2015 (FR) ..................... 15 02050

(51) Int. Cl.
*H04W 74/08*    (2009.01)
*H04B 7/185*    (2006.01)
(Continued)

(52) U.S. Cl.
CPC ...... *H04W 74/0833* (2013.01); *H04B 7/1851* (2013.01); *H04B 7/18539* (2013.01);
(Continued)

(58) Field of Classification Search
CPC ....... H04L 47/127; H04L 47/10; H04L 43/16; H04L 1/0002; H04L 41/0896;
(Continued)

(56) References Cited

U.S. PATENT DOCUMENTS

2004/0008726 A1*   1/2004  Kelly ................. H04L 12/2854
                                                     370/468
2004/0136334 A1    7/2004  Heiman et al.
(Continued)

FOREIGN PATENT DOCUMENTS

EP     1 686 746 A1    8/2006
EP     2 787 702 A1    10/2014

*Primary Examiner* — Kwang B Yao
*Assistant Examiner* — Ricardo Castaneyra
(74) *Attorney, Agent, or Firm* — Baker & Hostetler LLP

(57) ABSTRACT

A method of adapting the capacity of a contention transmission channel between terminals and a connection station comprises a step of continuous estimation, using measurements in reception of expected bursts, a probability of receiving an empty expected burst Pe, or the probability Pe and a measured probability of receiving a burst Ps, or a probability of receiving a burst having undergone a collision Pc. The method determines a current quantity Gr, monotonically sensitive to the external loading of the contention channel, using an estimated probability, Pe or Pc, or of the two estimated probabilities Pe and Ps, and detects whether a crossing of a threshold from among two predetermined thresholds while deviating from a fixed nominal value of Gr has occurred to decide to increase or decrease the current capacity of the transmission channel. The connection station notifies the terminals in quasi-real-time of the current composition of the transmission channel.

16 Claims, 15 Drawing Sheets

(51) Int. Cl.
*H04L 12/24* (2006.01)
*H04L 12/26* (2006.01)
*H04L 12/801* (2013.01)

(52) U.S. Cl.
CPC .......... *H04L 41/0896* (2013.01); *H04L 43/16* (2013.01); *H04L 47/10* (2013.01)

(58) Field of Classification Search
CPC ............ H04W 28/04; H04W 28/0247; H04W 28/0289; H04W 72/0453; H04W 72/04; H04W 74/0808; H04W 74/0833; H04W 74/08; H04W 52/0206; H04B 7/18539; H04B 7/1851
See application file for complete search history.

(56) References Cited

U.S. PATENT DOCUMENTS

| | | | |
|---|---|---|---|
| 2006/0107164 A1 | 5/2006 | Baer et al. | |
| 2008/0181108 A1* | 7/2008 | Hashmi | H04L 47/10 370/231 |
| 2014/0301209 A1 | 10/2014 | Gineste et al. | |

* cited by examiner

METHOD FOR DYNAMICALLY ADAPTING THE CAPACITY OF A CONTENTION TRANSMISSION CHANNEL

CROSS-REFERENCE TO RELATED APPLICATION

This application claims priority to foreign French patent application No. FR 1502050, filed on Oct. 2, 2015, the disclosure of which is incorporated by reference in its entirety.

BACKGROUND

The present invention relates to a method of dynamically adapting the capacity of a contention transmission channel, shared on an up-path by and from a plurality of terminals to a network connection gateway.

The present invention also relates to a method of transmitting data packets or fragments of packets by a plurality of terminals to a network connection gateway, the transmission method using the said method of dynamically adapting the capacity of the contention transmission channel.

The present invention further relates to a system for implementing the method of dynamically adapting the capacity of the contention transmission channel and to a system for implementing the method of transmitting data packets and fragments of packets.

Generally, the invention is applicable to any communications system requiring a contention transmission channel on an uplink whose traffic is sporadic, dense and non-predictable, and able to use for example transparent or regenerative satellites and/or terrestrial wireless connections, or even cable-based connections.

Various contention access schemes are known, including the time-segmentation or slotted ALOHA protocol and its derivatives combining the capture effect CE and/or the effect of using (temporal or frequency) diversity and access conflict resolution CRD (Contention Resolution Diversity).

All these protocols are random protocols in which each user terminal accesses the transmission resources independently in relation to the other users. For each packet transmitted, the user waits for an acknowledgement of receipt from the recipient. If he does not receive it, he retransmits the same data with a random delay and this mechanism is repeated until receipt of an acknowledgement of receipt or until a maximum number of attempts have been made.

In order to avoid the congestion of the transmission channel in case of channel overload, it is known to implement a congestion control mechanism in the form of an algorithm.

The European patent published under the number EP 1 686 746 B1 describes a first congestion control algorithm within the framework of a slotted ALOHA protocol with diversity and with conflict resolution CRDSA ("Contention Resolution Diversity Slotted Aloha"). This algorithm uses information about the network loading. The way in which this network loading is evaluated is however not specified in the document. Information about the network loading originating from a central entity is regularly transmitted to the various terminals. If this loading exceeds a threshold, each terminal will increase, according to a decreasing probability and independently, the transmission delay of the fragments that it must send by an additional logical frame. If the loading decreases below the threshold, the terminal will also reduce, according to a given probability, the sending delay of its fragments by a logical frame. Each terminal will therefore wait for a different number of logical frames as a function of the inherent evolution of its congestion window, knowing that it will only be possible for a fragment and its replicas to be transmitted on a single logical frame. Logical frame is understood to mean a time interval of fixed duration defined by the telecommunications standard or system employed to communicate and which constitutes the time unit making it possible to fix a reference for the senders and for the receivers for the transmission and reception of data packets or fragments of these packets. A logical frame can be composed of a given number of time slots or elementary physical frames. In particular, in the case of contention access schemes which, for each fragment of useful data to be sent, generate one or more redundant fragments, such as for example the CRDSA scheme, the set of fragments (useful and redundant) is transmitted in a logical frame.

The advocated approach relating to congestion control in the European patent published under the number EP 1 686 746 B1, is a reactive approach which reacts to the overloading of the transmission channel by using a notion of loading threshold and which is therefore not a preventive approach. A non-negligible number of collisions may thus occur temporarily when the threshold is crossed and it could be that, as the reaction time for this overload is too large, this causes retransmissions of messages or message fragments causing an increase in the message transmission lag. This approach also involves a congestion and channel access control policy which is distinct between terminals and which is not managed in a centralized manner, and this may potentially penalize certain terminals and favour others. This approach may potentially cause an inequity between the user terminals and makes it difficult to apply distinct levels of quality of services for packets originating from one and the same terminal or from different terminals. These schemes also exhibit the drawback of artificially increasing the loading of the network due to the replicas generated systematically for each packet to be sent, thus making it more difficult to evaluate the actual loading, stated otherwise the loading related to the useful data.

In order to remedy the aforementioned drawbacks, document EP 2 787 702 A1 proposes a preventive approach and describes a congestion control algorithm for contention access network making it possible to minimize the number of retransmissions. The algorithm comprises a first step in which the number of terminals is continually evaluated during sending and a second step in the course of which is defined a sliding window of sending from terminals, depending on the estimation of the number of terminals and being aimed at regulating and spreading their transmissions. Thus, the rate of initial collisions (or initial unresolved collisions for schemes sending several data packets for a useful packet) between packets sent by several senders is decreased, the number of necessary retransmissions becomes substantially zero and the lag in transmitting a packet to its destination is substantially shortened. In this manner, preventive spreading makes it possible to keep the loading below a chosen operating point so as to avoid the collapse of the network. Furthermore, this second algorithm is executed in a centralized manner (no need for teledetection capacity for the senders), so all the active terminals use, at a given instant, the same congestion window, thereby allowing precise control of the congestion level and making it possible to ensure equity between terminals.

The two aforementioned documents are limited to the description of a method of controlling congestion of a slotted contention channel and presuppose a capacity of the contention channel which is fixed and unmodifiable. The problem of making sufficient channel capacity available, suitable for the traffic need of terminals, is neither described nor mentioned in these documents.

To date, the known transmission systems and methods which implement a slotted (synchronous) or non-slotted (asynchronous) contention transmission channel use a band of frequencies or more generally a set of communication resources that is preconfigured or modifiable at the very most through time scheduling, so as to offer the contention channel an adapted capacity suitable for smooth and predictable traffic of the terminals.

When the actual traffic of the terminals becomes dense, very sporadic and non-predictive, current systems and methods give rise to the following major deficiencies.

Firstly, a loss of capacity is created by over-dimensioning the resources allocated to the contention channel regardless of its type (slotted (SA) or non-slotted ALOHA channel, or higher-performance variants such as CRDSA). On average, this overcapacity is much greater than the instantaneous need of actual traffic to absorb non-predictable traffic spikes.

Thereafter, the definition of a dimensioning of the contention channel for a mean traffic profile poses a problem, related to unforeseeable but statistically inevitable congestion spikes on the channel, of the occurrence of very high access lags and therefore a reduction in the overall performance of the system, or indeed a collapse of the network.

Finally, modifying the capacity of the contention channel by time scheduling so as to follow a mean "profile" becomes useless when unforeseeable events (natural catastrophes for example) arise, since scheduling is a "model" which, on average, follows the traffic need of users, but does not correspond to the instantaneous and unforeseeable need in terms of communication resources.

Consequently, the definition of a "mean" capacity to be provided for in respect of the shared contention channel appears to be a difficult or indeed impossible task. At the user level, the network becomes unavailable with an increase in the access time and/or inefficient preventive congestion mechanisms on rebooting the network. At the system level, availability performance decreases.

The technical problem is to propose a method and a system for dynamically adapting the capacity of a contention transmission channel, shared on an outbound pathway by and from a plurality of terminals to a network connection gateway in order to respond rapidly and suitably to a demand for dense, sporadic and non-predictable traffic whichever variants of the ALOHA SA mode (CE, CRDSA, etc.) or non-slotted mode are used for the contention channel.

SUMMARY OF THE INVENTION

For this purpose, the subject of the invention is a method of dynamically adapting the capacity of a contention transmission channel using a predetermined access protocol, the channel being shared by a plurality of terminals TE forming a first network and defining an uppath from the terminals to a gateway GW for connection to a second network, the method being characterized in that it comprises the following steps:

in a first step, fixing the value of an external loading desired as nominal operating point of the channel, the actual external loading of the channel being equal to the current rate of new entrant terminals sending a respective burst of data on the channel;

in a second step, determining with the aid of a mathematical model or of a simulation, a first upper threshold $S_H$ and a second lower threshold $S_L$ of a quantity Gr monotonically sensitive to an external loading of the contention channel, the upper and lower external loadings of the contention channel corresponding respectively to the first upper threshold $S_H$ or second lower threshold $S_L$, the sensitive quantity Gr dependent on a first probability of receiving an empty burst Pe, or of a pair of the first probability Pe and of a second probability of successfully receiving a burst Ps, or of a third probability of a burst having undergone a collision Pc, and on the type and on parameters defining the contention access protocol;

in a third step, estimating continuously over an observation window of predefined width and on the basis of measurements in reception in the said observation window of the expected bursts a first measured probability of receiving an empty expected burst Pe, or a pair of measured probabilities made up of the first measured probability Pe and a second measured probability of successfully receiving a burst Ps, or a third measured probability of a burst having undergone a collision Pc;

in a fourth step, determining the current measured Gr sensitive quantity Gr as a function of the first measured probability Pe, or of the pair of measured probabilities Pe and Ps, or of the third measured probability Pc;

in a fifth decision-taking step, when a crossing of the first upper threshold $S_H$ by the current sensitive quantity takes place once or several consecutive times while getting further away from the value of the quantity corresponding to the nominal external loading, increasing the current capacity of the transmission channel by releasing additional communication resources and by informing through a return pathway the terminals of the new composition of the increased-capacity transmission channel; and/or when a crossing of the second lower threshold $S_L$ takes place by the current sensitive quantity once or several consecutive times while getting further away from the value of the quantity corresponding to the nominal external loading, decreasing the current capacity of the transmission channel by removing communication resources in terms of frequencies from among the transmission resources currently made available and by informing the terminals through the return pathway of the new composition of the decreased-capacity transmission channel.

According to particular embodiments, the method of dynamically adapting the capacity of a contention transmission channel comprises one or more of the following characteristics:

the width of the observation window defining the observation time period is chosen so as to be sufficiently small to filter amplitudes of a noise of fast fluctuations of the probability (Pe) or two probabilities (Pe, Ps) estimated continuously and to allow suitable reactivity;

the quantity Gr monotonically sensitive to the external loading of the contention channel is included in the set made up of the first measured probability of receiving an empty expected burst Pe; the third measured probability of burst collision Pc; an external loading G calculated on the basis of the first measured probability of receiving an empty expected burst Pe and of a maximum number of retransmissions K;

the third measured probability of burst collision Pc is either estimated directly on the basis of the measured number of bursts having undergone a collision that are observed in the observation window; or calculated on the basis of first measured probability of receiving an empty expected burst Pe and of the second measured probability of correctly receiving a burst Ps according to the expression:

$$P_c = 1 - (P_e + P_s);$$

the external loading G is calculated for an SA channel on the basis of the expression $$G=-P_e*Ln(P_e)/[1-(1-P_e)^{K+1}]$$

where

Pe designates the first measured probability of receiving an empty expected burst, and K designates the maximum number of retransmissions;

the first upper threshold $S_H$ and the second lower threshold $S_L$ of the sensitive quantity are determined on the basis of a model representative of the protocol used by the contention channel so as to minimize the errors in decisions regarding change of capacity, and to stabilize the decisions regarding change of capacity, and to ensure good temporal reactivity of change, and to optimize the performance of the channel so as to avoid a collapse of the channel because of an overly large number of collisions;

a decision $D_{up}$ is taken to increase the capacity of the channel when the crossing of the first upper threshold $S_H$ from above has taken place a first number $N_{up}$ of consecutive times, and/or a decision $D_{down}$ is taken to decrease the capacity of the channel when the crossing of the second lower threshold $S_L$ has taken place a second number $N_{down}$ of consecutive times from above, the first number $N_{up}$ being the smallest whole number greater than or equal to two such that: $(1-D_{up})^{N_{up}} \leq P_{up\_res}$ where $D_{up}$ designates the probability of a good decision when the upper threshold has been crossed from below once and $P_{up\_res}$ a predetermined residual probability of bad decision, and the second number $N_{down}$ being the smallest whole number greater than or equal to two such that: $(1-D_{down})^{N_{down}} \leq P_{down\_res}$ where $D_{down}$ designates the probability of a good decision when the lower threshold has been crossed from above once and $P_{down\_res}$ a predetermined residual probability of bad decision;

the second number of consecutive crossings $N_{down}$ is markedly greater than or equal to the second number of consecutive crossings $N_{up}$ in a ratio $N_{down}/N_{up}$ greater than or equal to 5, preferably greater than or equal to 10;

the decided increasing and/or decreasing of capacity of the channel is performed by following in a way one and the same profile of growth and decrease of the capacity in stages or by degrees;

the contention access protocol used by the channel is included in the slotted set of contention protocols made up of the time-segmentation or slotted ALOHA protocol (Slotted ALOHA) and its derivatives combining the capture effect CE and/or the effect of using (temporal or frequency) diversity and access conflict resolution CRD (Contention Resolution Diversity);

the method of dynamically adapting the capacity of the RACH channel furthermore comprises an initialization step in the course of which at an instant of booting the current capacity of the transmission channel is set to a predetermined initial capacity value;

the initial capacity is an arbitrarily fixed average capacity at the minimum equal to a burst every N whole frames.

The subject of the invention is also a method of transmitting data packets or fragments of packets in the form of bursts through a contention transmission channel, shared by a plurality of terminals forming a first network and defining an uppath from the terminals to a gateway for connection to a second network, the said transmission method being characterized in that it comprises a method of dynamically adapting the capacity of the transmission channel such as defined hereinabove, and a stream control method coupled with the said method of dynamically adapting the capacity; the stream control method comprising the following steps:

in a sixth step providing a current list of classes of terminals distinguishing the classes of terminals authorized to send and the classes of terminals that are prohibited from sending, in a seventh step, when the crossing of the upper threshold $S_H$ prompts a decision to increase the capacity of the channel and when a predetermined maximum size of the channel is reached, triggering an increase in the level of stream control while prohibiting a class of terminals, authorized to send of the current list and chosen randomly, from sending, and in the same seventh step, when the crossing of the lower threshold $S_L$ prompts a decision to decrease the capacity of the channel, triggering a reduction in the level of stream control while authorizing a class of terminals, prohibited from sending of the current list and chosen randomly, to send;

According to particular embodiments, the transmission method comprises one or more of the following characteristics:

the transmission method comprises a congestion control method, coupled with the stream control method and in which the spreading of the lags of the terminals authorized to send is an increasing function of the level of stream control.

The subject of the invention is also a system for transmitting in the form of bursts of data packets or fragments of packets through a contention transmission channel, comprising a plurality of terminals forming a first network, and a gateway for connection to a second network, the connection gateway being configured to receive in the form of bursts data packets or fragments of packets sent by the terminals on a contention uppath transmission channel, and to dynamically adapt the capacity of the said contention uppath transmission channel as a function of a traffic of entrant terminals, the said transmission system being characterized in that the connection gateway is configured to:

estimate continuously over an observation window of predefined width and on the basis of measurements performed in reception in the said observation window of the expected bursts a first probability of receiving an empty expected burst $P_e$, or a pair of probabilities made up of the first probability Pe and a second probability of correctly receiving a burst $P_s$, or a third probability of burst collision $P_c$;

determining a current quantity Gr monotonically sensitive to the external loading of the contention channel on the basis of the first estimated probability Pe or the pair of probabilities made up of the first estimated probability Pe and the second estimated probability of receiving a correct burst $P_s$, or the third probability of receiving a burst having undergone a collision of a burst $P_c$; and then when a crossing of a first upper threshold $S_H$ by the current quantity takes place once or several consecutive times while getting further away from the value of the quantity corresponding to the nominal external loading, increasing the current capacity of the transmission channel by releasing additional communication resources in terms of additional frequencies and by informing the terminals through a return pathway of the new composition of the increased-capacity transmission channel; and/or when a crossing of the second lower threshold $S_L$ by the current quantity takes place once or several consecutive times while getting further away from the value of the quantity corresponding to the nominal external loading, decreasing the current capacity of the transmission channel by removing communication resources in terms of frequencies from among the transmission resources currently made available and by informing the terminals through the return pathway of the new composition of the decreased-capacity transmission channel.

According to particular embodiments, the transmission system comprises one or more of the following characteristics:

the connection gateway is configured to implement a stream control mechanism consisting in:
  providing a current list of classes of terminals distinguishing the classes of terminals authorized to send and the classes of terminals that are prohibited from sending, and
  when the crossing of the upper threshold $S_H$ by the current quantity Gr prompts a decision to increase the capacity of the channel and when a predetermined maximum size of the channel is reached, triggering an increase in the level of stream control while prohibiting a class of terminals, authorized to send of the current list and chosen randomly, from sending, and
  when the crossing of the lower threshold $S_L$ by the current quantity Gr prompts a decision to decrease the capacity of the channel, triggering a reduction in the level of stream control while authorizing a class of terminals, prohibited from sending of the current list and chosen randomly, to send.

BRIEF DESCRIPTION OF THE DRAWINGS

The invention will be better understood on reading the description of several embodiments which follows, given solely by way of example and while referring to the drawings in which.

DETAILED DESCRIPTION

The invention is described hereinbelow with reference to a satellite communications system in which a plurality of users, each having their own inherent terminal equipment TE, are linked by way of a multi-beam "transparent" satellite (known as a "bent pipe") to gateways GW allowing access to a terrestrial network. This does not limit the scope of the invention which can apply to various communications systems using, for example, regenerative satellites and/or terrestrial wireless connections, or even cable-based connections.

Figure 1:
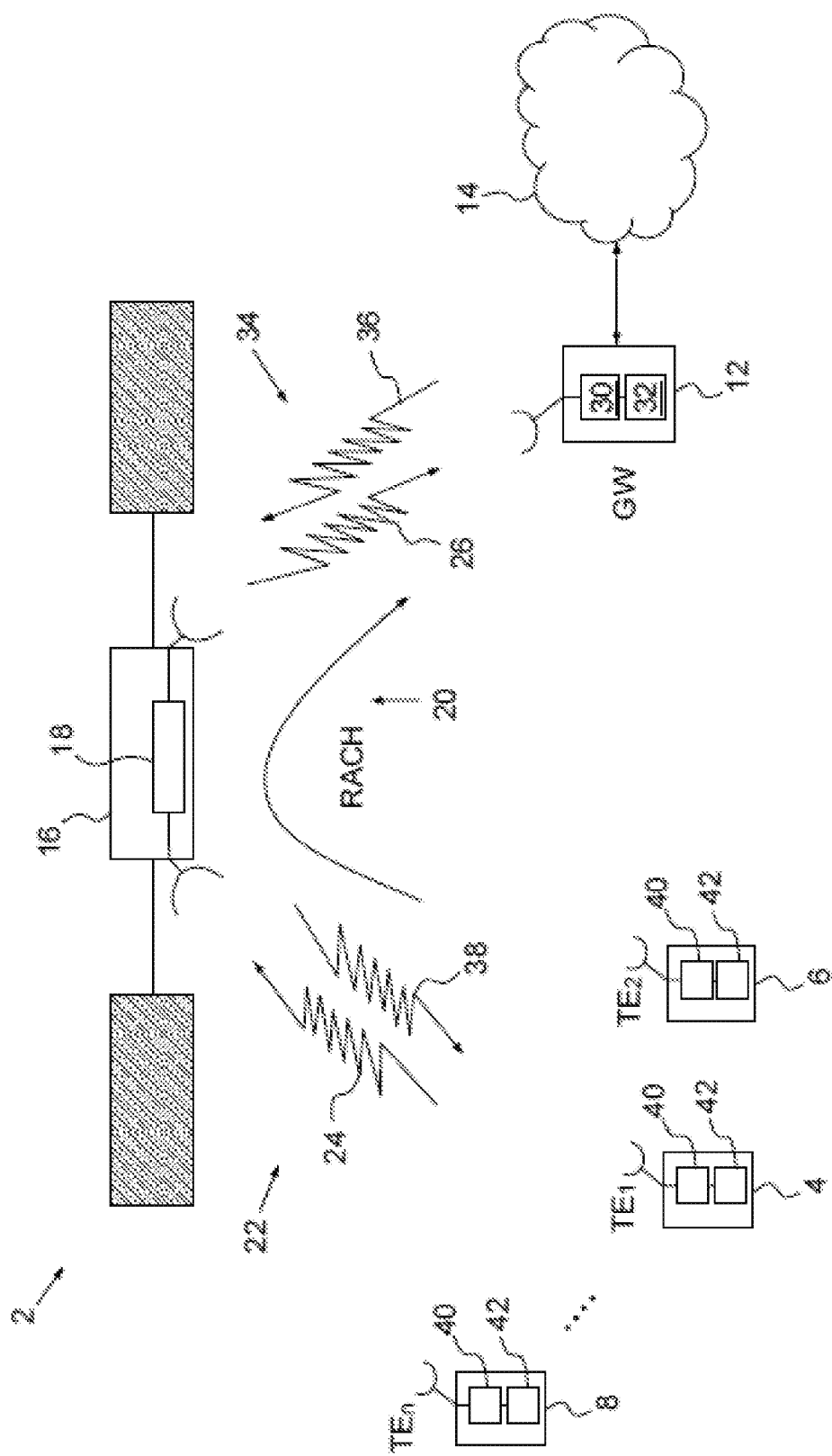
FIG. 1 is a schematic view of a transmissions system configured to implement a method of dynamically adapting the capacity of a contention channel, here considered slotted by way of example, according to the invention.

According to FIG. 1, a satellite communications system 2, configured to implement the invention, comprises a number n of terrestrial user terminals $TE_1$, $TE_2$, ... $TE_n$, only three terminals 4, 6, 8 corresponding to the respective designations $TE_1$, $TE_2$, $TE_n$ being represented in FIG. 1 for the sake of simplicity, a gateway 12 for connection to a second network 14 such as for example the Internet network, and a satellite 16 SAT.

The satellite 16 comprises a transparent payload 18 which serves as relay between the terminals 2, 4, 6 and the connection gateway 12 GW. The terminals 4, 6, 8 are each configured to send in the form of bursts data packets or fragments of packets to the connection gateway GW through a contention transmission channel 20, designated by RACH (Random Access Channel) and forming an up-path 22 decomposed into a first uplink 24 from the terminals 4, 6, 8 to the satellite 16 and a second uplink 26 from the satellite 16 to the connection gateway 12.

The connection gateway is configured to receive and demodulate with the aid of a gateway receiver 30 the bursts of the data packets or fragments of packets sent by the terminals 4, 6, 8 on the contention uppath RACH transmission channel 20 shared by the terminals 4, 6, 8.

The connection gateway 12 GW is also configured to dynamically adapt the capacity of the said contention uppath RACH transmission channel 20 as a function of sporadic non-predictable traffic of entrant terminals. This dynamic adaptation of the capacity is carried out by processing steps, executed by a gateway processing unit 32, and by notifying the set of terminals 4, 6, 8 in a regular and continuous manner of the composition of the RACH channel through a signalling return downpath 34 requiring low capacity.

Regular and continuous notifications must be interpreted as dispatches of information relating to the updated composition of the RACH channel according to a period of less than a second, typically of the order of a few hundreds of milliseconds, so as to reduce the total time required for the acquisition procedure by the terminals.

The downpath 34 decomposes into a first downlink 36 from the connection station 12 to the satellite 16 and a second downlink 38 from the satellite 16 to the terminals 4, 6 and 8.

When classes of terminals are defined, a stream control mechanism can be implemented by regular and continuous notification to the set of terminals 4, 6, 8 of an updated list of the classes of terminals authorized to send by the gateway GW, the notification of the updated list being carried out in addition to the composition Each terminal 4, 6 and 8 comprises a sender/receiver 40 and a terminal processing unit 42, which are configured to receive the RACH contention transmission channel 20 management information dispatched by the connection station 12 on the signalling return downpath 34, and utilize this information to make rapid use of current transmission resources of the RACH channel, adapted in terms of volume to the instantaneous current traffic demand.

As a variant and in addition to an optional stream control mechanism coupled with the method of dynamically adapting the capacity of the transmission channel 20 RACH, the terminals 4, 6, 8 are configured to implement a channel congestion control mechanism in which the spreading of the retransmission lags of the terminals authorized to send is a predetermined increasing function of a level of stream control representative of the degree of congestion of the channel.

Subsequently, the external loading of the RACH channel and the internal loading of the RACH channel will be distinguished using the following definitions.

The external loading of the RACH channel is defined as the rate of new entrant terminals transmitting a burst on the RACH contention channel. For example, an external loading of 10% means that there are ten times as many resources available in terms of bursts (or logical frame unit) as new entrant terminals on average per unit time. A loading of 100% means that there are as many resources available in terms of temporal segments of a logical frame as new entrant terminals on average per unit time.

The internal loading of the RACH channel is defined as the total rate of transmissions of bursts on the contention channel which includes the new entrant terminals and the retransmissions in progress because of collision(s) or of bad reception of the burst (conventional error rate).

Figure 2:
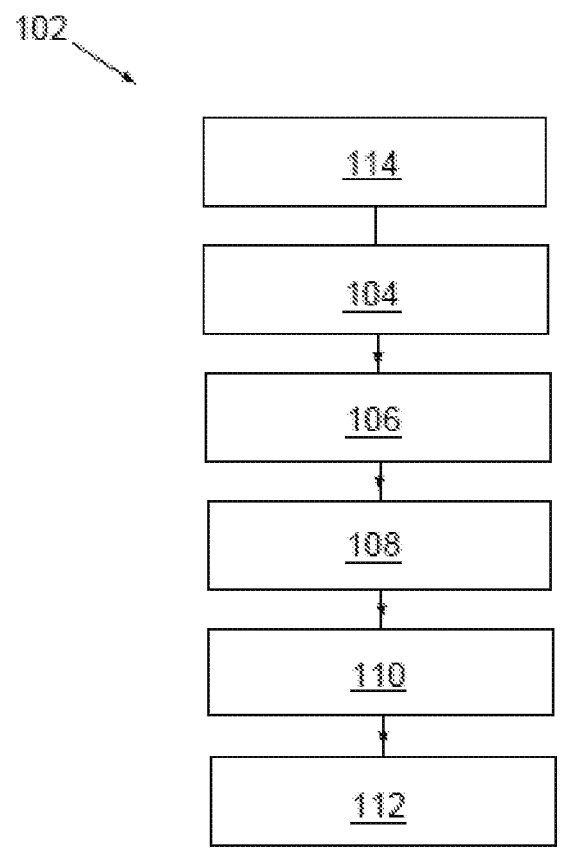
FIG. 2 is a flowchart of a method of dynamically adapting the capacity of a contention channel, here considered slotted by way of example, according to the invention, implemented by the communications network of FIG. 1.

According to FIG. 2, a method 102 of dynamically adapting the capacity of the RACH contention transmission channel 20 is illustrated. The RACH contention channel 20 uses a predetermined random access protocol, is shared by a plurality of terminals 4, 6, 8 forming a first network, and it follows the uppath 22 from the terminals 4, 6, 8 to the connection gateway 12. The method 102 comprises a set of steps.

In a first step 104, a value of an external loading desired as nominal operating point of the channel is fixed, the actual external loading of the channel being equal to the current rate of new entrant terminals sending a respective burst of data per unit time on the channel 20. Typically, the value of this external loading is fixed at 20% or 25% for a conventional slotted contention channel of the SA ("Slotted ALOHA") type or at a value greater than 25% according to the performance of the access protocol or scheme used. For example for a CRDSA access scheme the value is fixed close to 50% and for an SA-CE ("Slotted ALOHA—Capture Effect") access scheme the value is fixed close to 40%. It should be noted that the "external" loading corresponds to the loading generated by the new entrant terminals solely entering the network, excluding retransmissions. The operating point of the RACH channel depends directly on the mode, slotted or non-slotted, and on the maximum number of retransmissions K which is already known as a parameter of the first network of terminals 4, 6, 8 TE.

Next in a second step 106, with the aid of a mathematical model or of a simulation, a first upper threshold $S_H$ and a second lower threshold $S_L$ of a quantity Gr monotonically sensitive to the external loading of the contention channel are determined. Theoretical upper and lower external loadings of the contention channel correspond respectively to the first upper threshold $S_H$ or second lower threshold $S_L$; the sensitive quantity Gr, which is theoretical here, depends on a first probability of receiving an empty expected burst Pe, or of a pair of probabilities made up of the first probability Pe and of a second probability of successfully receiving a burst Ps, or of a third probability Pc of receiving a burst having undergone a collision Pc, and on the type and on parameters defining the contention access protocol.

Next in a third step 108, the processing unit 30 of the connection gateway 12 GW estimates continuously over an observation window of predefined width, and on the basis of measurements in reception in the said observation window of the expected bursts, a first measured probability of receiving an empty expected burst Pe, or a pair of measured probabilities made up of the first measured probability Pe and a second measured probability of successfully receiving a burst Ps, or a third measured probability of receiving a burst having undergone a collision Pc.

It should be noted that a measured probability of a burst having undergone a collision $P_c$ can be deduced from the pair of measured probabilities Pe and Ps on the basis of the relation Pc=1−(Pe+Ps) and that these probabilities depend on the maximum number of retransmissions K.

Thereafter in a fourth step 110, a current measured sensitive quantity $Gr_m$ corresponding to the theoretical sensitive quantity Gr of the second step 106 is determined as a function of one of the probabilities measured Pe and Pc or of the two measured probabilities Pe and Ps.

Next in a fifth step 112, one of the following decisions is taken.

According to a first decision, when a crossing of the first upper threshold $S_H$ by the current sensitive quantity $Gr_m$ takes place once or several consecutive times while getting further away from the value of the quantity corresponding to the nominal external loading, the connection gateway 12 increases the current capacity of the RACH transmission channel by releasing additional communication resources in terms of additional frequencies and/or codes, and by informing all the terminals 4, 6, 8 through the return pathway of the new composition of the increased-capacity RACH transmission channel.

According to a second decision, when a crossing of the second lower threshold $S_L$ by the current sensitive quantity $Gr_m$ takes place once or several consecutive times while getting further away from the value of the quantity corresponding to the nominal external loading, the connection gateway 12 decreases the current capacity of the transmission channel by removing communication resources in terms of frequencies and/or codes from among the transmission resources currently made available and by informing all the terminals through the return pathway of the new composition of the decreased-capacity transmission channel.

In a particular manner and in the case where a coupling exists between the contention RACH channel and a channel in DAMA ("Demand Assigned Multiple Access") mode, the capacity of the SA channel or of one of its derivatives is increased while the capacity used in DAMA "Demand Assignment Multiple Access" mode is reduced correspondingly if it can be reduced at this instant without thereby losing the service quality required by the users that already have an established session. Conversely during the crossing of the low threshold $S_L$ of the loading, the inverse operation is carried out by increasing the capacity of the channel in DAMA mode and by correspondingly decreasing the capacity of the channel in contention mode.

The first upper threshold $S_H$ and the second lower threshold $S_L$ of the sensitive quantity are determined on the basis of a model representative of the protocol used by the contention channel so as to:

minimize the errors in decisions regarding change of capacity, and stabilize the decisions regarding change of capacity, and ensure good temporal reactivity of change, and optimize the performance of the channel so as to avoid a collapse of the channel because of an overly large number of collisions.

In the course of the third step 108, the estimation of the probabilities Pe, Ps and optionally Pc is done by filtering over a small observation time period so as to reduce the large amplitudes of the "noise" of fluctuations of these instantaneous probabilities and to have a reactivity adapted to the user need while limiting the taking of decisions regarding modifications of the composition of the channel.

A filtering by a simple sliding average MA (or "Moving Average") of short length (typically about ten frames) is sufficient to obtain good results and correct stability. As a variant, more sophisticated prediction filterings can be used. Generally, any stable filtering of short length is appropriate.

The method 102 of dynamically adapting the capacity of the RACH channel furthermore comprises an initialization step 114 in the course of which at an initial or booting instant of the method, the current capacity C of the transmission channel is set to an initial capacity value $C_0$.

The initial capacity $C_0$ is an average capacity, fixed arbitrarily and at the minimum equal to a burst every N whole frames, corresponding to the minimum capacity required to at least boot the network and allow the first users to instigate their access to the network. Next, the capacity of the RACH channel is adapted dynamically in quasi-real-time according to the estimations of the measured probabilities Pe, Ps and Pc.

The contention access protocol used by the channel is included for example in the set made up of the time-segmentation or slotted ALOHA protocol and its derivatives combining the capture effect CE and/or the effect of using (temporal or frequency) diversity and access conflict resolution CRD (Contention Resolution Diversity).

Figure 3:
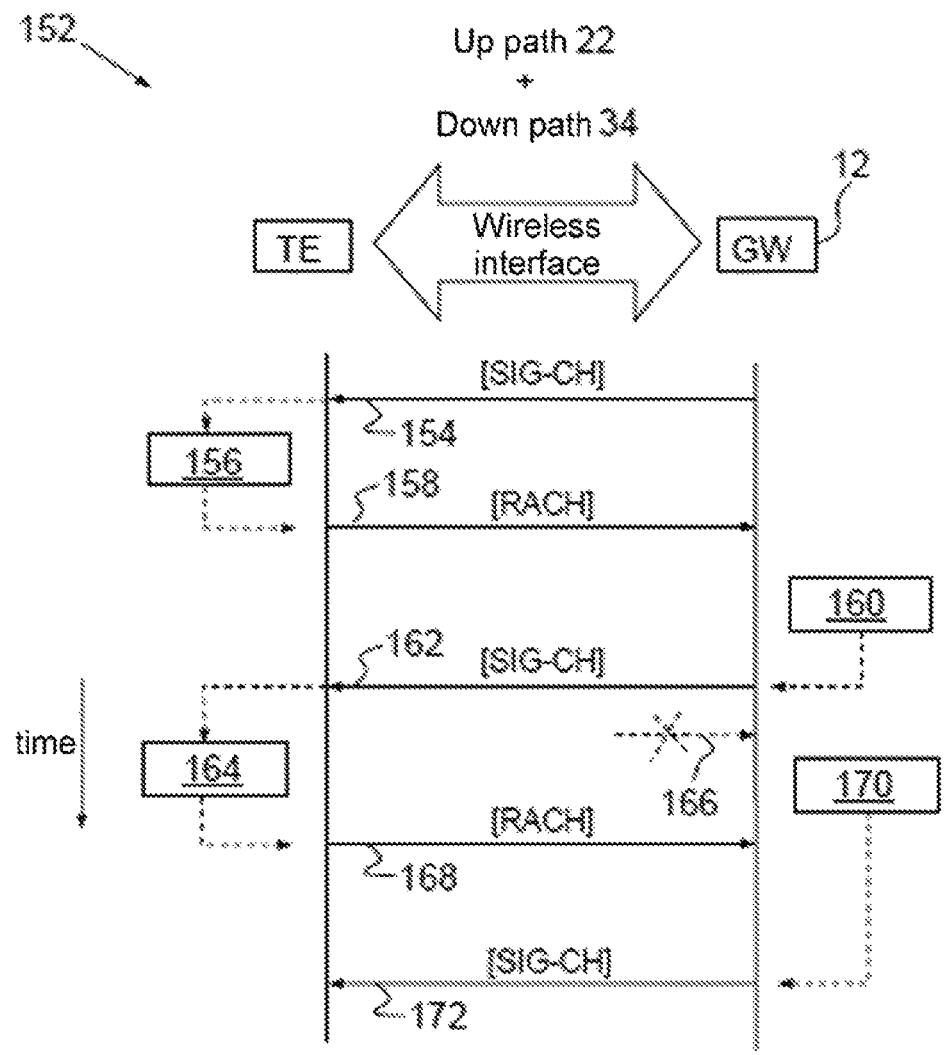
FIG. 3 is a view of a timechart of the signals exchanged between a user terminal TE of the network and a connection gateway GW of the communications network of FIG. 1 during the establishment of a communication and/or a communication established between the user terminal and the connection gateway, this view being focused on the exchanges allowing the implementation of the method of dynamic adaptation of the invention, described in FIG. 2.

According to FIG. 3, a timechart describes a typical sequence 152 of processed signals exchanged between an arbitrary user terminal 4, 6, 8 of the first network, designated by TE, and the connection gateway 12, designated by GW. This sequence 152 is observed during the establishment of a communication and/or during a communication established between the user terminal TE and the connection gateway GW, and this sequence 152 relates more particularly to the exchanges and processings allowing the implementation of the method of dynamic adaptation 102 of the invention, described in FIG. 2.

In a first phase 154, the gateway 12 dispatches to the terminals 4, 6, 8 of the network on a signalling channel SIG-CH of the downpath 34 of the wireless interface GW-TE the composition of the RACH channel in terms of usable transmission resources and if appropriate management control information in the form of the classes of usable terminals.

The terminal TE extracts 156 the signalling information and, assuming that it is authorized to send, dispatches 158 to the gateway GW data regarding usage of the RACH channel on a currently available transmission resource of the RACH channel.

In a second phase 160 posterior to the first phase 154, the gateway GW utilizes the real-time estimation of the probabilities Pe, Ps and Pc and updates the information regarding the current composition in resources of the channel and/or the stream control information. Here, the second phase 160 is posterior to the reception of the usage data of the dispatch 158. Next, the gateway GW notifies 162 the terminals of this update information by dispatching it on the channel SIG-CH.

The terminal TE extracts 164 the signalling information and, assuming that it is authorized to send, dispatches one or more times 166 without successful receipt the same data regarding usage of the RACH channel to the gateway GW by using one or more of the currently available transmission resources of the RACH channel, the failure or failures of receipt being attributable to collisions of bursts. The terminal TE ultimately succeeds in successfully dispatching 168 the data regarding usage of the RACH channel by using a currently available transmission resource of the RACH channel such as authorized in the second phase 160.

In a third phase 170, posterior to the second phase 160, the gateway GW utilizes the real-time estimation of the probabilities Pe, Ps and Pc and updates the information regarding the current composition in terms of resources of the channel and/or the stream control information. Here, the second phase 170 is posterior to receipts of dispatch(es) having failed 166 of data regarding usage on the RACH channel and prior to the successful receipt of the dispatch 168 on the RACH channel of the same data regarding usage of the RACH channel by the terminal.

Next, the gateway GW notifies 172 the terminals of the updated information by dispatching it on the return pathway signalling channel SIG-CH.

Figure 4A:
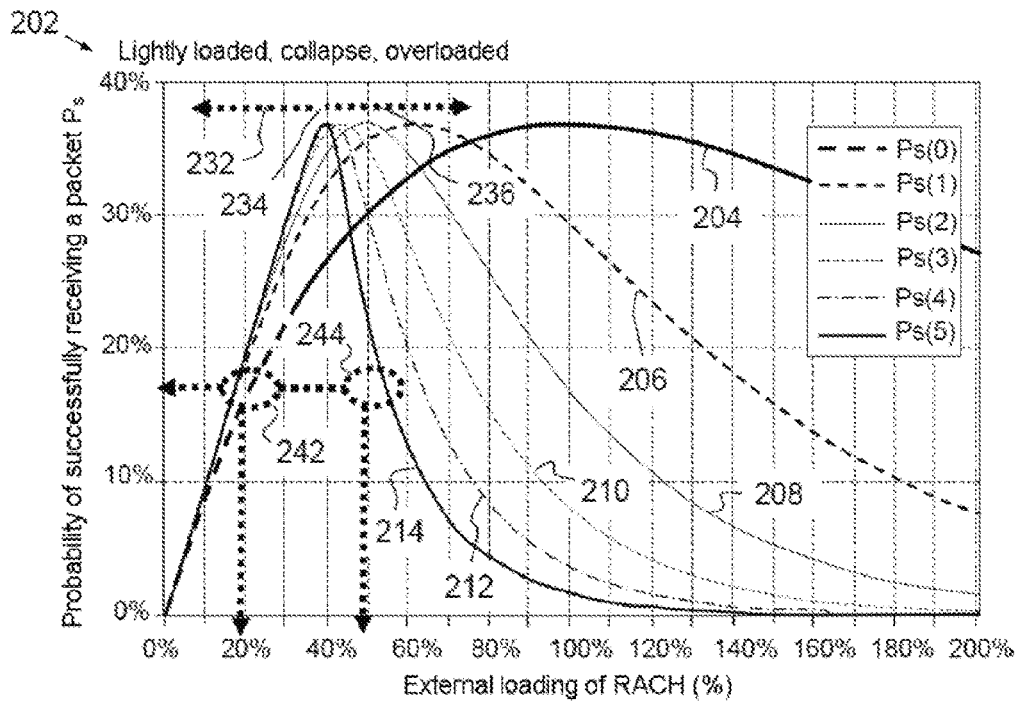
FIGS. 4A and 4B are respectively a view of the evolution of the probability of successfully receiving a burst Ps as a function of the external loading of the channel for various values of the maximum number of retransmissions K varying from 1 to 5 and a view grouping the evolutions of the probability of successfully receiving a burst Ps, of the probability of receiving an expected and empty burst Pe, of the probability of collision of an expected burst Pc as a function of the external loading of the channel for a maximum number of retransmissions K equal to 5 when the protocol used is of the SA (Slotted ALOHA) type.
Figure 4B:
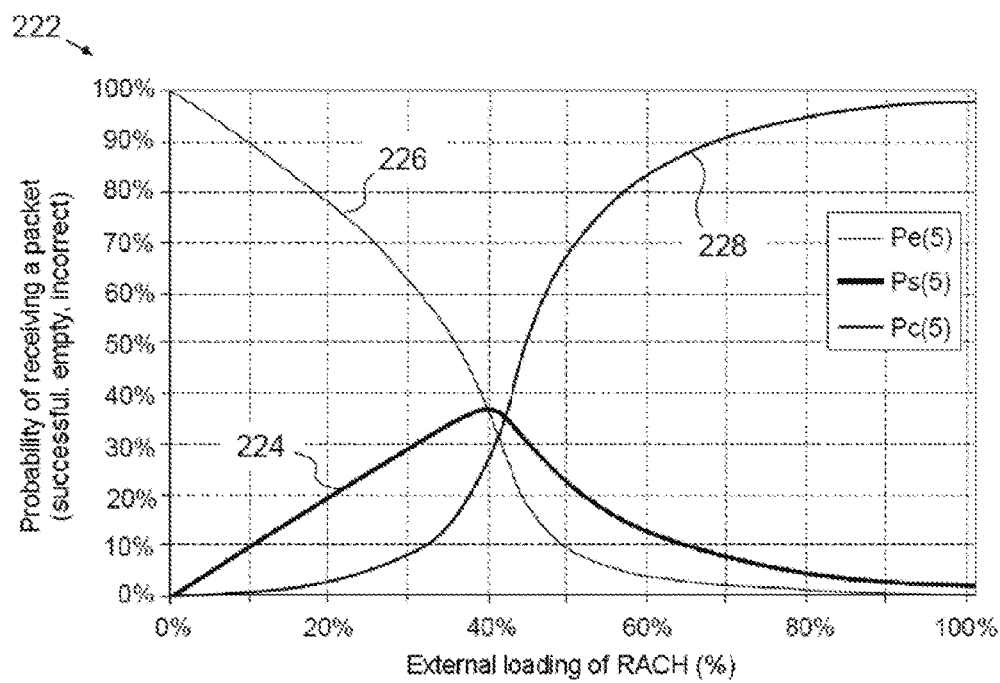

FIGS. 4A and 4B recall respectively the theoretical evolution of the probability of successfully receiving a burst Ps as a function of the normalized external loading of the RACH channel for various values of the maximum number of retransmissions K varying from 1 to 5 (respectively curves 204, 206, 208, 210, 212, 214) and the theoretical evolutions 222 of the probability of successfully receiving a burst Ps (curve 224), of the probability of receiving an expected and empty burst Pe (curve 226), of the probability of collision of an expected burst Pc (curve 228) as a function of the normalized external loading of the RACH channel for a maximum number of retransmissions K equal to 5 when the protocol used is of slotted type (Slotted ALOHA);

FIG. 4A demonstrates for curve 214 (or curve designated by Ps(5) corresponding to a maximum number of retransmissions K equal to 4) a lightly loaded or unloaded zone 232 of the system, and then the collapse 234 of the RACH channel on an excess of collisions just after its maximum efficiency of about 36% with a maximum external loading of 37%, and an overload zone 236.

Curve 204, designated by Ps(0) and corresponding to K equal to zero, shows the conventional case of an efficiency of about 36% for a normalized external loading of 100% without retransmission.

According to these curves 204, 206, 208, 210, 212, 214, an ambiguity exists concerning the determination of the external loading as a function of the probability of success Ps alone. For example by considering curve 214, to one and the same probability of success Ps(5) equal to 18% there corresponds two points of RACH normalized external loading 242, 244, situated on either side of the channel collapse point 234.

The utilization of one of the probabilities Pe, Pc of empty burst or burst having undergone one or more collisions makes it possible to remove this ambiguity to adapt the capacity of the RACH channel since the evolution of these probabilities is monotonic as illustrated in FIG. 4B. To a probability value Pe of curve 226 or Pe(5) there corresponds a unique and different value of the normalized external loading of the RACH channel and with each value of the normalized external loading varying from 0% to 100% is associated a unique and different value of the probability Pe. Likewise, to a probability value Pc of curve 228 or Pc(5) there corresponds a unique and different value of the normalized external loading of the RACH channel and with each value of the normalized external loading varying from 0% to 100% is associated a unique and different value of the probability Pc.

Figure 5:
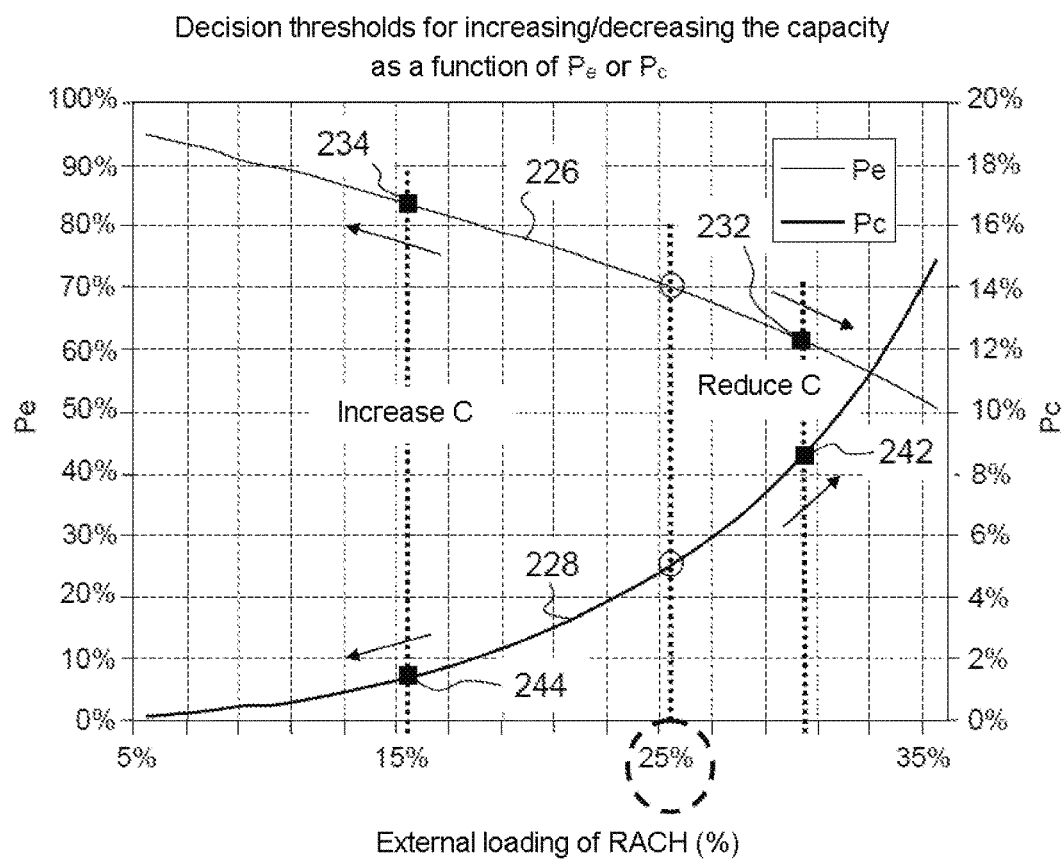
FIG. 5 is a view of the relevant parameters governing the decision to increase or to decrease the capacity of the channel as a function of a measured quantity Pe or Pc representative with sufficient sensitivity of the external loading of the RACH channel when this channel is a channel of the SA type and the maximum number of retransmissions K is equal to 5.
Figure 6:
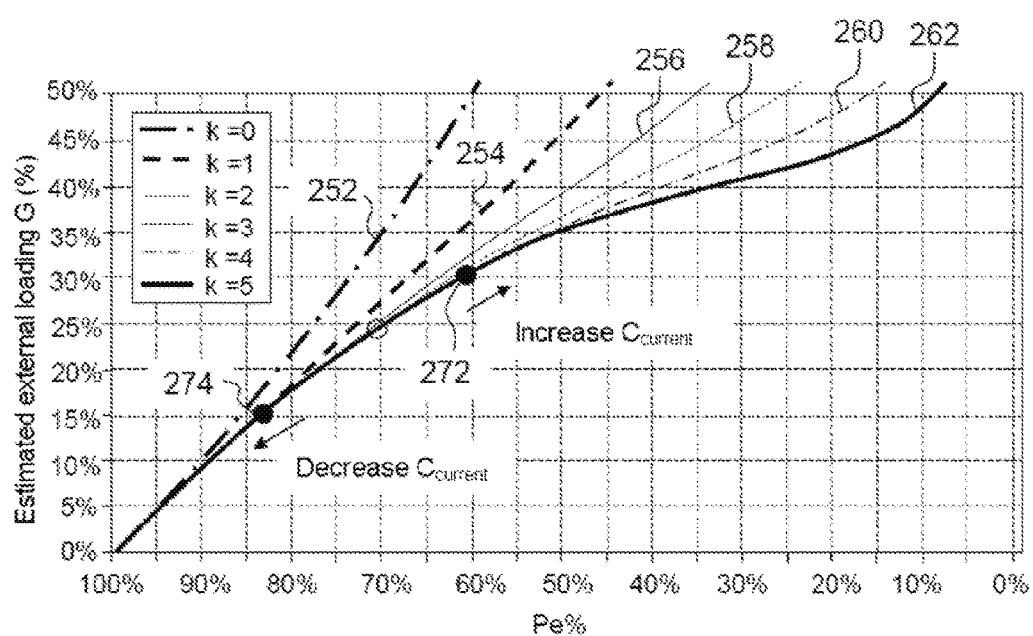
FIG. 6 is a view of the relevant parameters governing the decision to increase or to decrease the capacity of the channel as a function of a quantity G of external loading, calculated on the basis of measured probability Pe representative quasi-linearly of the external loading of the RACH channel when this channel is a channel of the SA type and the maximum number of retransmissions K is equal to 5.

According to FIGS. 5 and 6, relevant threshold parameters $S_H$, $S_L$ governing the decision to increase (or "upgrade") or to decrease (or "downgrade") the external capacity of the RACH channel around a nominal operating point of the RACH channel are illustrated when this channel is a channel of the SA type and the maximum number of retransmissions K is equal to 5.

These relevant threshold parameters are dependent in FIG. 5 on the probabilities Pe and Pc, described in FIG. 4, which constitute, as observed, quantities measurable in real time or quasi-real-time, representative in a non-ambiguous and sufficiently sensitive manner of the external loading of the RACH channel.

According to FIG. 5 and by way of example, the nominal operating point considered for the normalized external nominal loading is fixed arbitrarily at 25%, which stated otherwise means that the channel has a capacity or has at its disposal an amount of transmission resources that is four times greater than the bitrate or rate of entrants, without counting the possible retransmissions, at most five times here.

In this case, the a priori or theoretical probabilities of Pe and Pc are respectively about 70% and 5% for the 25% nominal normalized external loading considered.

According to a first embodiment, the decision to adapt the capacity of the RACH channel is based on the evolution of the probability Pe of receiving an empty burst such as described by curve 226. A capacity increase of the RACH channel is decided on crossing a first upper threshold 232 $S_H(Pe)$ equal to 60%, which corresponds to a first upper normalized external loading of the RACH channel equal to 30%, before channel collapse. A capacity reduction in the channel is decided on crossing a second lower threshold 234 $S_L(Pe)$ equal to 83%, which corresponds to a second upper normalized external loading of the RACH channel equal to 15%.

According to a second embodiment, the decision to adapt the capacity of the RACH channel is based on the evolution of the probability Pc of receiving an empty burst such as described by curve 228. An increase in the capacity of the RACH channel is decided on crossing a first upper threshold 242 $S_H(Pc)$ equal to 8.5%, which corresponds to a first upper normalized external loading of the RACH channel equal to 30%, before channel collapse. A capacity reduction in the RACH channel is decided on crossing a second lower threshold 244 $S_L(P_c)$ equal to 1.5%, which corresponds to a second upper normalized external loading of the channel equal to 15%.

According to a third embodiment and FIG. 6, the relevant threshold parameters are dependent on an estimation of the external loading G which is calculated as a function of the probability Pe of receiving an empty burst Pe and of the maximum number of retransmissions K according to the relation:

$$G=-P_e*Ln(P_e)/[1-(1-P_e)^{K+1}]$$

This relation is valid for a slotted contention channel of the SA type provided that the population of users who are liable to use the RACH channel over a long term is sufficiently large, that is to say greater than or equal to 20, this always being the case in practice, the population of users over the long term not having to coincide with the population of users who are using the RACH channel at a given instant.

In the case of an overload of the channel for which Pe tends to zero and G tends theoretically to infinity, the estimated external loading is clipped at 1. In an advantageous manner, when the third embodiment is implemented, the three items of information Pe, Ps and Pc are implicitly used in the estimator because of the fact that the term (1−Pe) in the denominator of the expression for G is equal to Ps+Pc.

According to FIG. 6, the effect of the maximum number of retransmissions K, represented through the various evolution curves 252, 254, 256, 258, 260, 262 corresponding respectively to values of K varying from 1 to 5, becomes negligible around the decision points 272, 274, chosen here in a manner analogous to those of curves 226 and 228 of FIG. 4, when K is greater than or equal to 3, this very generally being the case in practice.

According to the third embodiment, the decision to adapt the capacity of the RACH channel to an increase in the capacity of the RACH channel is decided on crossing the decision point 272 forming a first upper threshold $S_H(G)$, equal to 30% and identical to the first upper normalized external loading of the RACH channel equal to 30%, before channel collapse. A capacity reduction in the RACH channel is decided on crossing the decision point 274 forming a second lower threshold 244 $S_L(G)$, equal to 15% and identical to the second upper normalized external loading of the channel equal to 15%.

In an additional manner and independently of the chosen embodiment of the method of dynamically adapting the capacity of the RACH channel a decision $D_{up}$ is taken to increase the capacity of the channel when the crossing of the first upper threshold $S_H$ from above has taken place a first number Nup of consecutive times, and/or a decision $D_{down}$ is taken to decrease the capacity of the channel when the crossing of the second lower threshold $S_L$ has taken place a second number $N_{down}$ of consecutive times from above.

The first number $N_{up}$ is the smallest whole number greater than or equal to two such that: $(1-D_{up})^{N_{up}} \leq P_{up\_res}$ where $D_{up}$ designates the probability of a good decision when the upper threshold has been crossed from below once and $P_{up\_res}$ a predetermined residual probability of bad decision.

The second number $N_{down}$ being the smallest whole number greater than or equal to two such that: $(1-D_{down})^{N_{down}} \leq P_{down\_res}$ where $D_{down}$ designates the probability of a good decision when the lower threshold has been crossed from above once and $P_{down\_res}$ a predetermined residual probability of bad decision.

This makes it possible to reduce the errors of decisions due to the large instantaneous variations of the estimators with a predetermined residual probability of bad decision. The residual probabilities $P_{up\_res}$ and $P_{down\_res}$ can be chosen to be equal in a particular manner.

The second number of consecutive crossings $N_{down}$ is markedly greater than or equal to the first number of consecutive crossings $N_{up}$ in a ratio $N_{down}/N_{up}$ greater than or equal to 5, preferably greater than or equal to 10.

For example, an increase in the capacity of the RACH channel on crossing the threshold a number $N_{up}$ of consecutive times greater than three, that is to say for a duration of three frames. In the case of a decrease in the capacity, the number of consecutive times $N_{down}$ of logical frames is for example greater than or equal to 30, thereby making it possible to maintain the current capacity to absorb a possible subsequent traffic spike. The value of the number $N_{down}$ must be consistent with the duration of the observation window, typically at least twice the duration of this window.

The values $N_{up}$ and $N_{down}$ make it possible to stabilize the decision taking regarding modifying the current capacity of the channel and imposing the constraint of $N_{up}$ large compared with $N_{down}$ guarantees good reactivity of the adaptation method when requiring an increase in capacity and a progressive reduction in capacity when a capacity decrease is decided.

In all cases, the updating of the capacity will tend to maintain it around the nominal external loading which has been fixed. It should be noted that generally the maximum number of retransmissions K is less than or equal to 5, thereby limiting the overload created by the collisions and limiting the response times in spite of a reduction in the system performance in terms of success rate.

To summarize: the two decision thresholds are chosen sufficiently far apart around the nominal operating point so as to minimize the errors in decisions regarding change of external capacity, to stabilize the decisions regarding changing the said capacity, to ensure good temporal reactivity when changing capacity (fast rise, slower descent), and to avoid a collapse of the channel because of an overly large number of collisions.

The first and second decision thresholds as well as integers of stabilization of the decisions $N_{up}$ and $N_{down}$ are new system parameters implemented in the processing unit of the gateway GW.

The values of the thresholds are determined on the basis of a mathematical model validated by simulation or solely arising from simulations dependent on the system parametrization (for example maximum number of iterations in CRDSA mode, classes of powers in CE mode, etc.) and these threshold values depend on the slotted or non-slotted mode and on the maximum number of retransmissions K.

Figure 7:
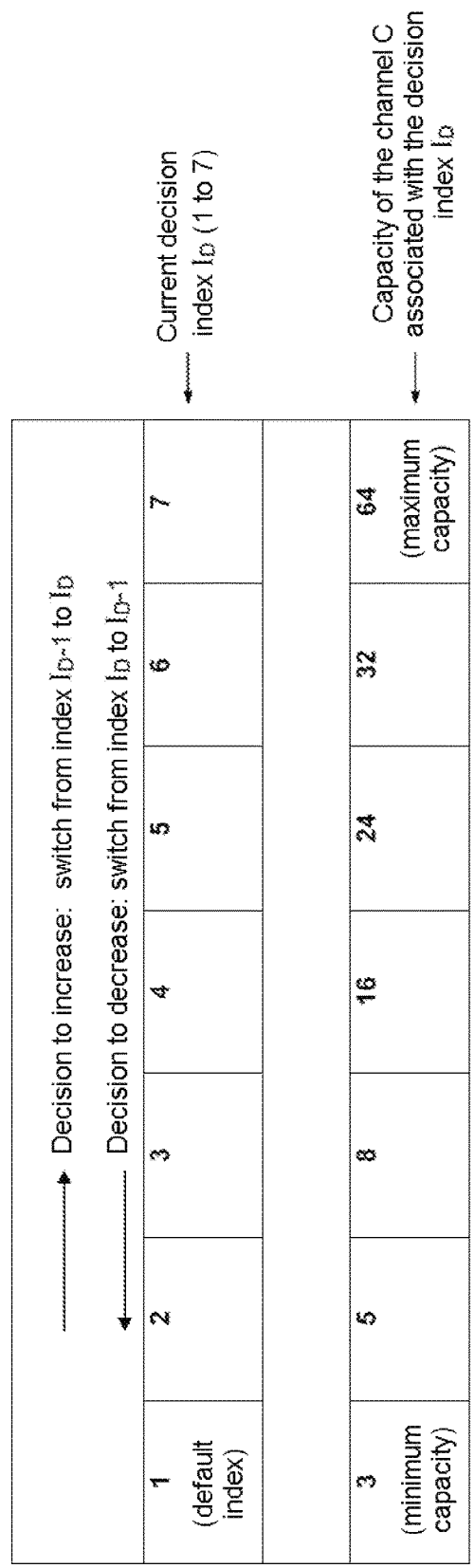
FIG. 7 is a view of an exemplary parametrizable table making it possible to impose a control profile to be followed when decisions regarding increasing and/or decreasing the capacity of the contention channel are executed.

According to FIG. 7, a configurable table 282, implemented in the gateway GW, is configured so that the decided increasing and/or decreasing of the external capacity of the channel is performed by progressively following one and the same profile of growth and decrease of the capacity in stages or by degrees.

The table 282 is used for updating the external capacity C when decision thresholds are crossed. The values of the size of this table and the values of capacities described in FIG. 7 are provided by way of example here.

A current decision index $I_D$ is incremented with each decision taken to increase the capacity and is decremented with each decision taken to decrease the capacity while remaining within the range of this table; and a notified current capacity value, expressed as a number of bursts per period, is associated with each value of the decision index described in table 282. Generally, the period is equal to a fixed whole number of times the duration of a logical frame. For example, the duration of the period is equal to the duration of a logical frame.

This effective mechanism for executing the decisions regarding modifying the external capacity makes it possible to have a granularity adapted to entrant traffic while guaranteeing good stability of the updating of the external capacity of the channel on decision taking so as to avoid overly fast oscillations or fluctuations while still following the envelope of the traffic spike as input.

For example, it will be possible to execute a decision to switch the external capacity from 3 to 5 and then from 5 to 8 bursts/frame and then a decision to switch from 8 to 5 and then from 5 to 3. But the execution of a capacity sequence of the type 3, 8, 16, 3 will not be possible according to table 282 since this sequence may give rise to an instability and overly frequent changes of capacity.

Dealing as they do with the reliability of the decision, the first, second, third embodiments described hereinabove are selected in order of priority with advantages and drawbacks as a function of the protocol used by the RACH channel.

In the case of a channel of the SA type, the most widespread mode, the third embodiment is preferred since it allows stability of the calculation of the external loading at input G because the three items of information regarding the estimated probabilities Pe, Ps and Pc are used and do not require any charts or a transformation function to obtain the values of the high and low thresholds. It also allows an operational simplification requiring only that a system operating point (a normalized external input capacity R of 25% for example), a first high threshold (+10% above R for example on increase) and a second low threshold (−20% below R for example on decrease) be given.

However, it should be noted that the third embodiment requires the calculation of the functions Ln(x) and power(x) whose CPU time may be considered to be significant if this calculation is performed aboard a satellite for example. This calculation time can be cancelled by using precalculated tables to the detriment of a small loss in precision, depending on the size of these tables which are respectively indexed by Pe and, (1−Pe) for each value of K.

In all the other cases of type of contention channel, the second embodiment, and then the first embodiment are preferred.

The measurement of collisions, performed in the second embodiment, reflects the effective collision loading and requires two filterings (estimations of Pe and Ps to deduce Pc therefrom) while the first embodiment, functionally equivalent in terms of probability, does not reflect the collision rate, while requiring just a single item of filtered information Pe.

The first and second embodiments each require from the operational standpoint a chart giving the probabilities, arising from results of simulations, of the first and second thresholds for taking decisions regarding increasing and decreasing the capacity as a function of the number of retransmissions and of other parameters related directly to the type and to the performance of the access mode (CRDSA, CE, etc.).

The method of dynamically adapting the capacity of a contention channel using a predetermined protocol such as described hereinabove allows fast and quasi-instantaneous adaptation of the capacity of the RACH channel with a response time of less than a second. A typical response time is a time equivalent to a certain number N of consecutive frames which is greater than or equal to the sum of the observation period $T_{obs}$ and of the time equivalent to the first number $N_{up}$ of consecutive frames, it being considered that the duration of a frame is small, for example typically equal to 26.5 ms when a digital video satellite broadcasting protocol such as DVB-RCS is used.

Generally, the method of dynamic adaptation according to the invention is based on continuous measurement of the external loading of the RACH channel. The method of dynamic adaptation according to the invention is complemented by terminals stream regulation in the case where this capacity cannot be allocated fully to meet the traffic demand.

The method of dynamically adapting the capacity of an RACH channel according to the invention, supplemented if appropriate with a stream control mechanism, enables in particular a dense, sporadic and non-predictable traffic demand to be met effectively and independently of the variant of the mode used (slotted or non-slotted, CE, CRDSA, etc.).

The method of dynamic adaptation allows for total flexibility of the plan for allotting the transmission resources of the RACH channel according to the temporal dimension and other dimensions such as the frequency, the spreading sequence.

Figure 8A:
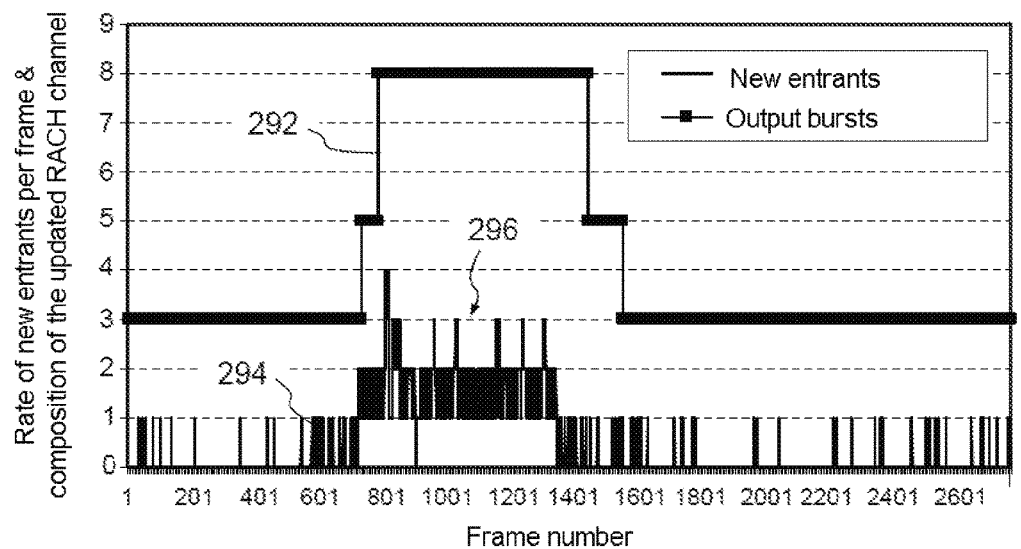
FIGS. 8A and 8B are respectively a first view of the real-time evolution of the capacity of the contention channel on a spike of input demands in the access network and of a simulated stabilization of the probabilities Pe, Ps, Pc and of the external loading to be maintained around the required operating point.
Figure 8B:
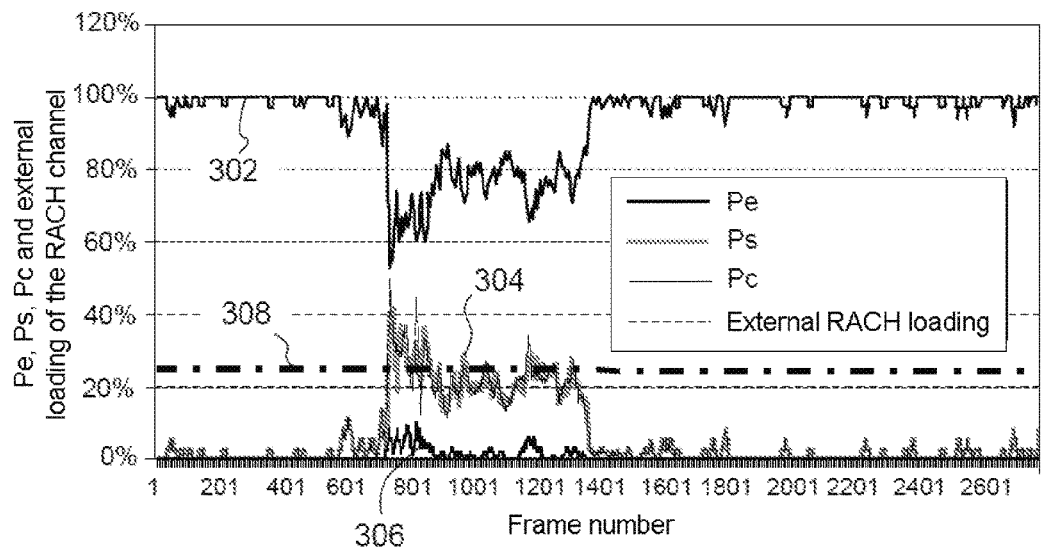

According to FIGS. 8A and 8B, a simulated exemplary response of the RACH channel to a sporadic and non-predictive spike in input traffic demands is illustrated when the method of dynamic adaptation according to the invention is implemented.

According to FIG. 8A, a first curve 292 represents the real-time evolution of the external capacity of the channel in terms of number of output bursts used per frame, the current time being represented by the index number of a corresponding frame which is individually incremented as a function of the number of past frames. A second curve 294 represents the temporal evolution of the input traffic in terms of rate of new entrants, this evolution 294 comprising a spike 296 in demands to enter the network or for access on the RACH channel. FIG. 8A indeed demonstrates fast, almost real-time, adaptation and a stability in the number of communications resources required to maintain an external loading.

According to FIG. 8B, a first curve 302 represents the continuous temporal evolution of the first simulated probability of receiving an empty burst Pe, the current time being represented in the manner of FIG. 8A by a current frame index number. A second curve 304 represents the continuous temporal evolution of the second simulated probability of successfully receiving a burst, and a third curve 306 represents the continuous temporal evolution of the third simulated probability of receiving a burst having undergone a collision Pc. A fourth curve 308 represents the temporal evolution of the simulated external loading of the RACH channel. FIG. 8B indeed shows the stability of the probabilities Pe, Ps, Pc regarding the adaptation of the channel and the convergence of the external loading around the nominal operating point fixed in the first step and here at 25%.

Figure 9A:
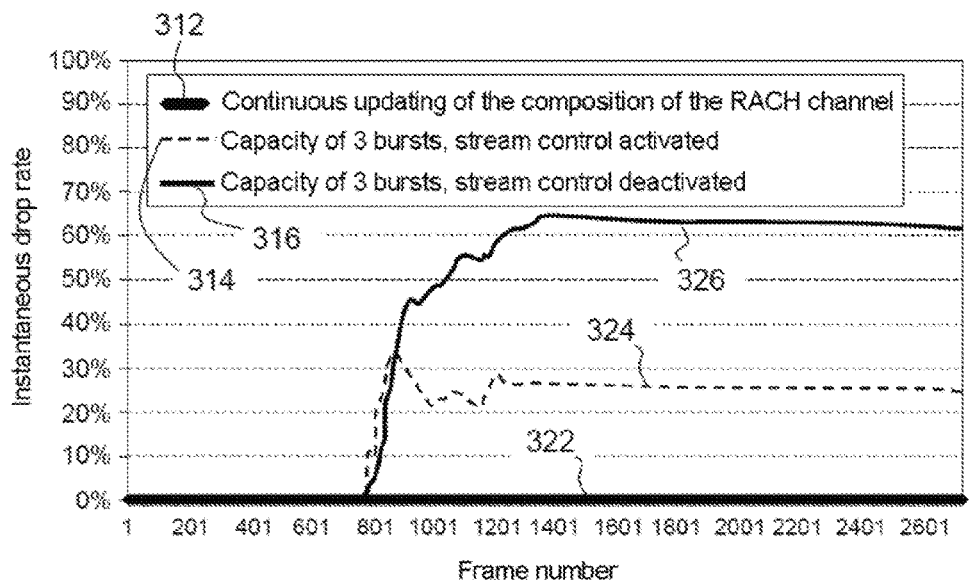
FIGS. 9A, 9B and 9C are respectively a first view of the evolution of the failure rate according to three modes of channel adaptation, including that of the invention, a second view of the evolution of the cumulative probability of success as a function of the elapsed time since the first attempt according to the same modes of channel adaptation, and a third view of the distribution of the number of transmissions required as a function of the three modes of channel adaptation.
Figure 9B:
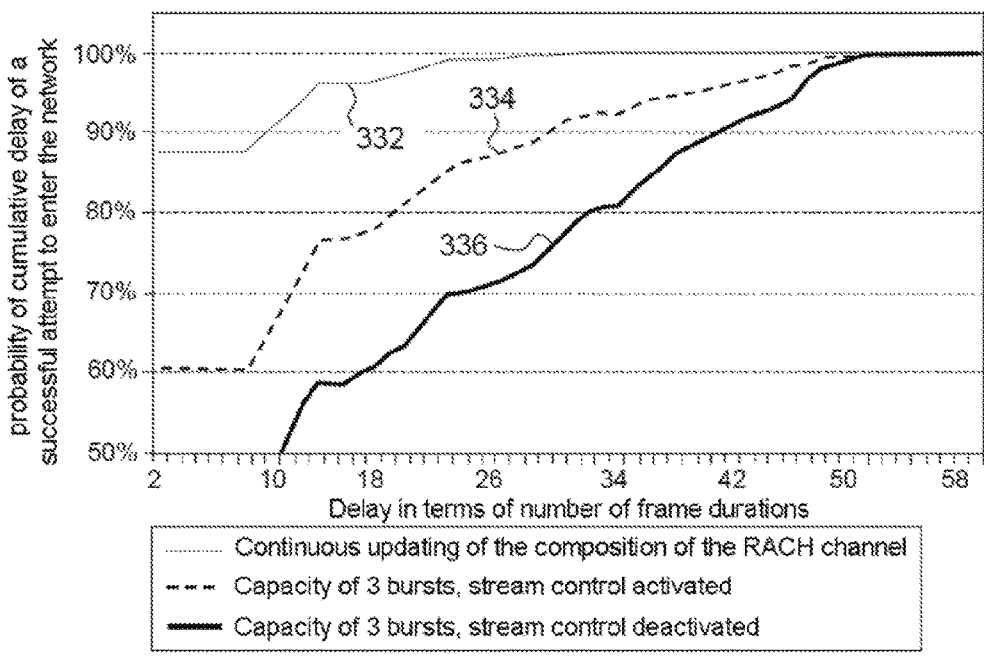
Figure 9C:
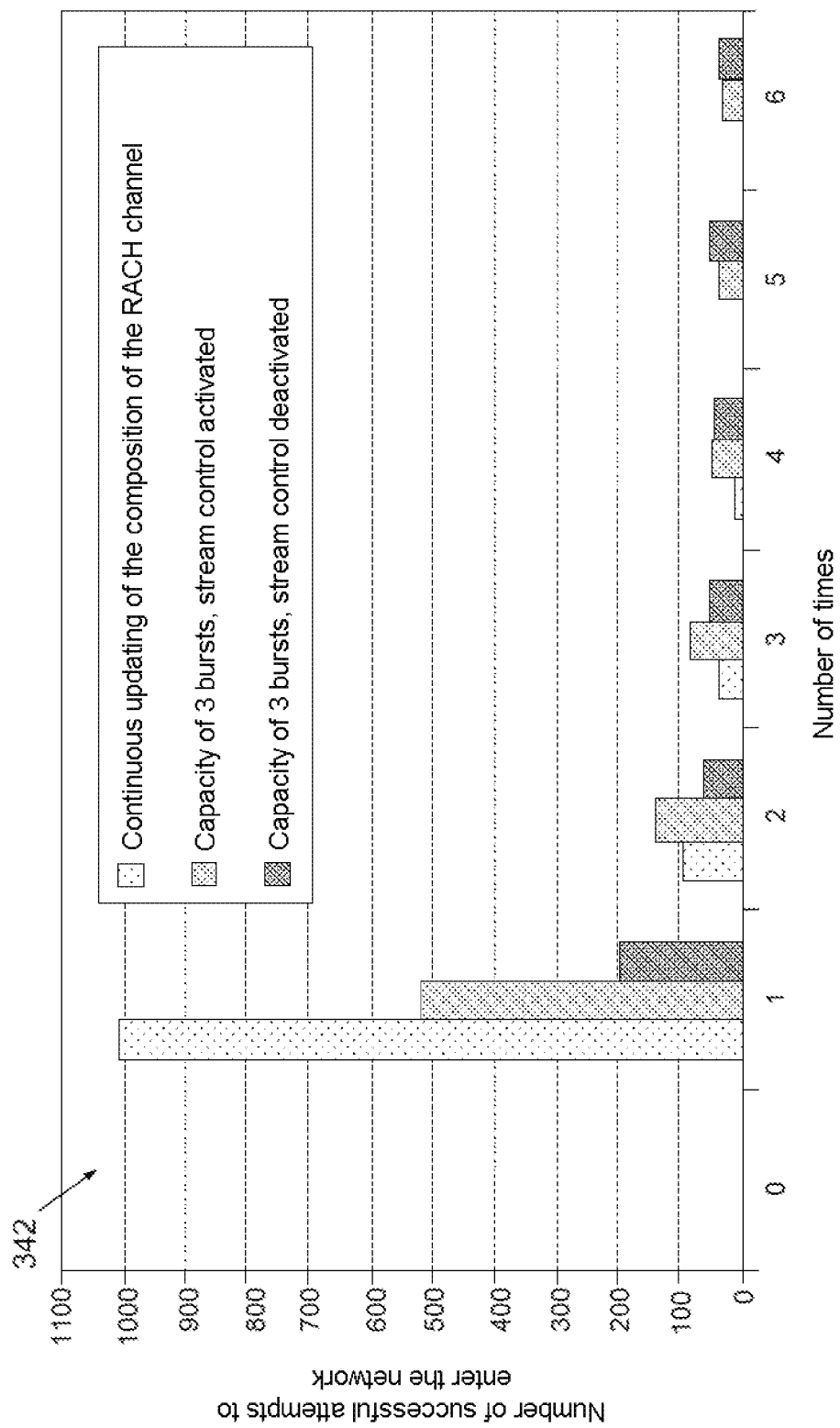

According to FIGS. 9A, 9B and 9C, the performance of three modes of channel adaptation in terms of access failure and success rates and response times are compared when the RACH channel is subjected to input traffic having the same profile as the input profile 296 of FIG. 8A. A first mode 312 implements the method of dynamically adapting the channel in which the composition of the RACH channel is updated and notified in a continuous manner to the terminals through a downpath common signalling return channel. A second mode 314 implements a static method in which the external capacity of the RACH channel is fixed at three bursts per frame and the stream control mechanism is activated. A third mode 316 implements a static method in which the external capacity of the RACH channel is fixed at three bursts per frame and the stream control mechanism is deactivated.

According to FIG. 9A, first, second, third curves 322, 324, 326 respectively represent the temporal evolution of the failure rate of the new entrants of the first, second, third modes 312, 314, 316. FIG. 9A demonstrates that the instantaneous failure rate varies according to the possibility of adapting the external capacity of the RACH channel and that this rate is zero when the RACH channel uses the method of dynamically adapting the channel according to the invention, that is to say is in the first mode 312. Furthermore, the influence of a coupling with stream control is observed through a decrease by a factor of 2.6 in the instantaneous failure rate of 65% in the third mode 316 which goes to 25% in the second mode 314.

According to FIG. 9B, first, second, third curves 332, 334, 336 represent the respective evolution of the cumulative probability of delay of a successful attempt to enter the network as a function of the value of the delay expressed as a number of frame durations for the first, second and third modes 312, 314, 316. FIG. 9B demonstrates that when the capacity of the channel is dynamically adapted according to the first mode 312, a transmission of a burst is sufficient to obtain a probability of success equal to 88% and a single retransmission is required to obtain a probability of success of 98%. Furthermore, the beneficial influence of using a method of stream control in the second mode 314 with respect to not using stream control in the third mode 316 is observed through a decrease by a factor of 1.4 from a necessary delay of 41 frame durations in order to reach a probability of successful access of an entrant of 90% in the third mode to a necessary delay of 29 frame durations in order to reach this same probability of 90% in the second mode 314.

According to FIG. 9C, a distribution of the number of transmissions required for successful entry to the network as a function of the number of retransmissions, represented on the abscissa axis, is provided for each of the modes 312, 314, 316.

The distribution 342 confirms the beneficial influence first and foremost of dynamic adaptation of capacity and the beneficial effect of implementing stream control in the case where an instantaneous increase in the capacity of the channel is not possible, especially because of a lack of available resources at a given instant.

Figure 10:
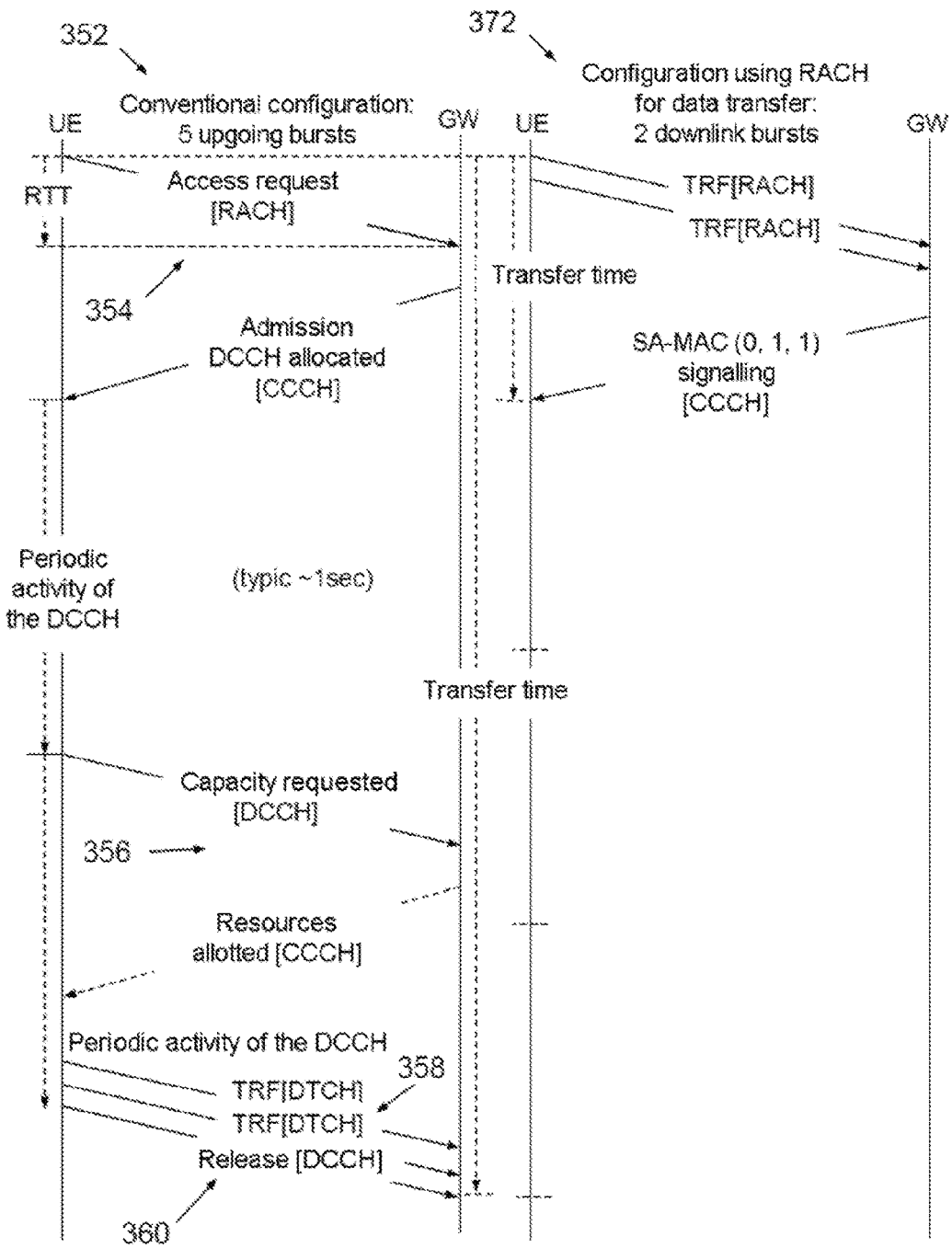
FIG. 10 is a comparative view of the signalling exchanges required for a transfer of a small volume of user data from a terminal TE to the gateway GW between a first conventional transmission configuration in which the RACH ("Random Access Channel") contention channel is used only in the network access phase and other channels of a DAMA ("Demand Assigned Multiple Access") or PAMA ("Pulse-Address Multiple Access") mode are used for the actual transfer of the user data, and a second configuration using the invention in which the RACH channel actually transfers the user data.

According to FIG. 10, a first conventional configuration 352 for transferring data between a terminal TE and a gateway GW uses a first contention RACH channel and a second channel in DAMA ("Demand Assigned Multiple Access") or PAMA ("Pulse Assigned Multiple Access") mode, coupled with the first RACH channel and in general comprises four steps or phases.

In a first phase 354, the terminal TE accesses the network via the contention RACH channel, defined by a time-segmentation logical frame shared between users, and waits for at least one minimum control resource allocation as response of a CCCH (Common Control Channel) notification channel.

Next, in a second phase 356, the terminal TE requests dedicated resources (DAMA mode) via the DCCH (Dedicated Control Channel) control channel which was allocated to it in the first phase 354 to convey the data which may be useful data of a user service or else data for signalling and/or control of the transmission system such as for example synchronization data, power control, etc.

Thereafter, in a third phase 358, the terminal TE transfers the useful volume of data to the gateway GW on the allocated resources, in this instance a DTCH ("Dedicated Traffic Channel") traffic channel, which were allocated in the second phase 356 on the notification channel CCCH.

Next in a fourth phase 360, the resources DCCH and DTCH, allocated in the first and second phases 354, 356, are released at the end of the transfer.

The control channel DCCH is generally dedicated on a circuit multiplexed between the terminals TE.

The resources allocated are: either in DAMA mode (predominantly the case), or in PAMA or "circuit" mode, optionally multiplexed.

This first data transfer configuration 352 can be used and is used to transfer low volumes of data.

The typical applications which require a low volume of data are for example of the gathering ("collection") type; remote metering/sensors, alarms, the "SMS" equivalents. Another application may also be the MAC/DAMA layer signalling (request for capacity, maintenance-synchronization, etc.).

This first data transfer configuration 352 is inefficient for transferring small volumes of sporadic data. Indeed, the ratio of the volume of the useful data to the total volume of the resources allocated and the useful transfer time to the total session time are low for this configuration.

A second configuration 372, described in FIG. 10, is proposed for alleviating this inefficiency. The second data transfer configuration 372 advantageously utilizes the flexibility of the RACH channel capacity updating afforded by the method for adapting the RACH channel capacity so as to transfer the data directly on this RACH channel, to thus maximize the instantaneous capacity required without channel collapse, and minimize the useful resources and the transfer session times.

The user's data are then segmented over a few outbound bursts by the terminal TE and then reassembled by the gateway GW. A lightweight protocol in non-connected mode between the terminal TE and the gateway GW is implemented so as to be able to retransmit optional data segments (type "list of segments received/not received" for example) when a collision of bursts takes place. The number of outbound bursts required depends directly on the size of the payload of an according to the performance of the waveform used in terms for example of modulation/coding, guard time.

By considering for example two outbound bursts to convey the data of a user terminal TE, the diagrams of the exchanges dimensioned for the transfer of these two useful bursts make it possible to determine a first gain factor, in terms of useful resources, equal to about two (2.25 bursts for the second configuration instead of 5.12 bursts for the first configuration), and a second gain factor, in terms of useful transfer time, equal to about four when a geostationary satellite is used.

Figure 11A:
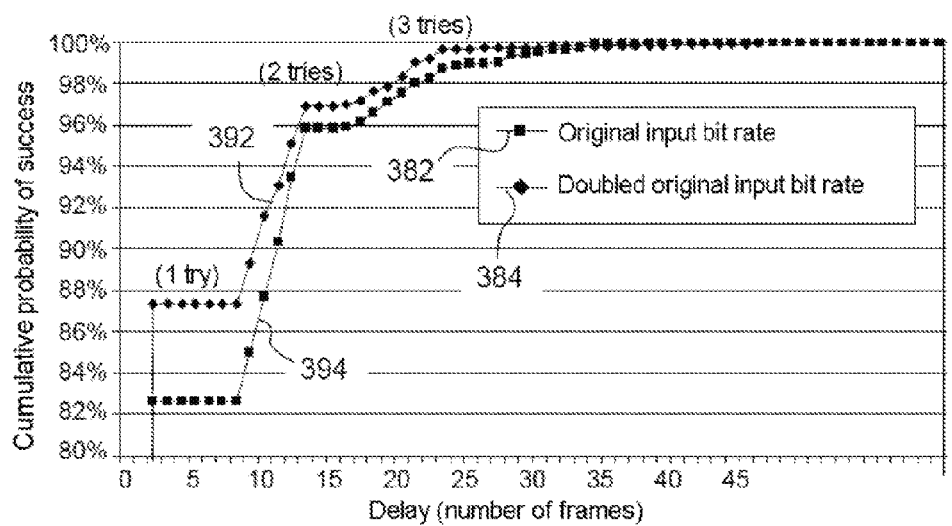
FIGS. 11A and 11B are respectively a first view of the evolution of the cumulative probability of successfully transferring an arbitrary burst as a function of the transfer time of the burst for a reference input bitrate of a burst by terminal TE and an input bitrate of double the reference input bitrate, and a second view representative of the temporal evolution of output capacity of the RACH channel according to the invention in response to two profiles of input rates associated respectively with the reference input bitrate and with the doubled reference bitrate used in the first view.
Figure 11B:
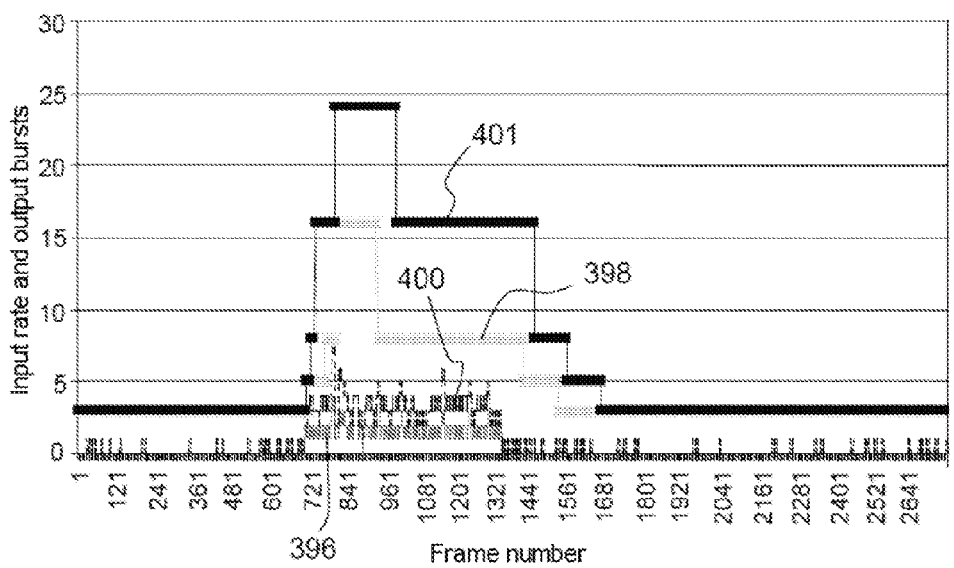

FIGS. 11A and 11B show the beneficial effect of the method of dynamically adapting the RACH channel, when the RACH channel is used for the transfer of non-predictable sporadic data traffic of low volume and when switching from a first traffic profile 382 having input bitrate spikes requiring one upgoing burst per TE to a second traffic profile 384 having input bitrate spikes requiring two upgoing bursts per TE.

According to FIG. 11A, a first curve 392 represents the evolution of the cumulative probability of access success time of an entrant as a function of time or of delay, expressed as a number of frame durations, in response to the first traffic profile 382.

A second curve 394 represents the evolution of the cumulative probability of access success time of an entrant as a function of time in response to the second traffic profile 384 in which the entrant bitrate of the spikes is double that of the spikes of the first profile.

In the case of the first profile 382, 88% of the access attempts culminated in a single try without collision, and 97% of the access attempts culminated with at most one retransmission.

In the case of the second profile 384, 83% of the access attempts culminated in a single try without collision, and 96% of the access attempts culminated with at most one retransmission.

According to FIG. 11B, a first curve 396 represents the temporal evolution of an input traffic having the first profile 382, the current time being expressed by a current frame index number. A second curve 398 represents the real-time evolution of the external capacity of the RACH channel in terms of number of output bursts used per frame in response to the input traffic 396 having the first profile. A third curve 400 represents the temporal evolution of an input traffic having the second profile 384. A fourth curve 401 represents the real-time evolution of the external capacity of the RACH channel in terms of number of output bursts used per frame in response to the input traffic 400 having the second profile 384.

FIGS. 11A and 11B demonstrate that the transfer time, and therefore the number of retransmissions on collision, is hardly impacted by the number of upgoing bursts required on average for an input bitrate. FIGS. 11A and 11B also show the stability of the decisions taken regarding the updating of the capacity which follows in real time the envelope of the spike in instantaneous bitrate at input.

Figure 12:
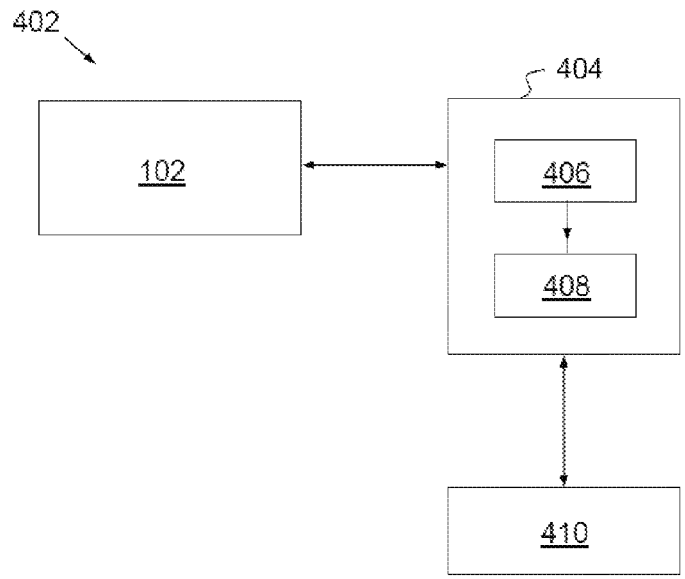
FIG. 12 is a flowchart of a method of transmitting data packets on a contention transmission channel, using the method of dynamic adaptation of FIG. 2, a stream control method and optionally a congestion control method, coupled with the method of dynamically adapting the capacity of the RACH channel.

According to FIG. 12, a method 402 for transmitting data packets or fragments of packets in the form of bursts uses a slotted contention RACH transmission channel and comprises a set of steps.

The RACH channel is shared by a plurality of terminals forming a first network and defines an outbound pathway from the terminals to a gateway for connection to a second network.

The transmission method 402 comprises the method 102 of dynamically adapting the capacity of the transmission channel, such as described hereinabove and in FIG. 2 and a stream control method 404, coupled with the method of dynamically adapting the capacity 102.

The stream control method 404 comprises a sixth step 406 and a seventh step 408.

In the sixth step 406, the gateway GW provides a current list of classes of terminals in which the classes of terminals authorized to send and the classes of terminals for which sending is prohibited are distinguished.

Next in the seventh step 408, when the crossing of the upper threshold $S_H$ prompts a decision to increase the capacity of the channel and when a predetermined maximum size of the channel is reached, the gateway triggers an increase in the level of stream control by prohibiting, by random drawing, a class of terminals, authorized to send of the current list, from sending.

In the same seventh step 408, when the crossing of the lower threshold $S_L$ prompts a decision to decrease the capacity of the channel, a reduction in the level of stream control is triggered by authorizing, by random drawing, a class of terminals, prohibited from sending of the current list, to send.

The current list is thus updated and random drawing makes it possible to guarantee equity between the user terminals.

Furthermore, the transmission method 402 comprises, as a supplement to the stream control method 404 and coupled with the method 102 of dynamically adapting the capacity of the RACH channel, a congestion control method 410 in which the spreading of the lags of the terminals authorized to send is an increasing function of the level of stream control.

By being based on the number of prohibited classes, and therefore implicitly on the external loading of the channel, the congestion control spreads the transmission lags of the terminals authorized to send. The coupling of congestion control with stream control makes it possible to limit the transmission failure rate and to exit the congestion phase more rapidly.

Figure 13:
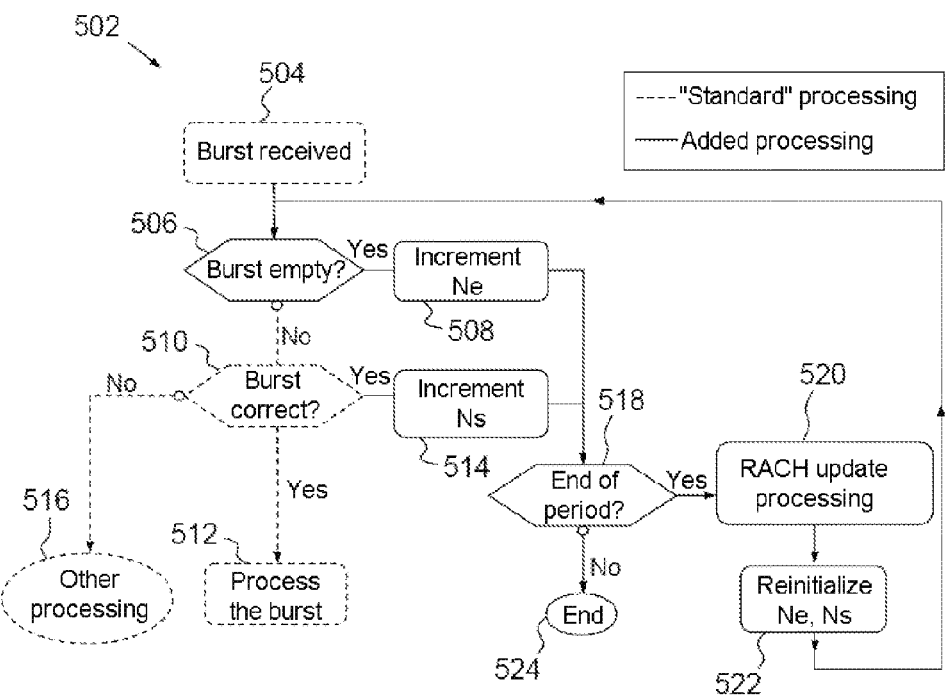
FIG. 13 is a flowchart of a first part of the processing implemented by the processing unit of the gateway GW making it possible to carry out the method of dynamically adapting the capacity of FIG. 2 and the transmission method of FIG. 12 including the stream control mechanism.

According to FIG. 13, steps 104, 106, 110, 112 of the method of dynamically adapting the capacity of the RACH channel and the stream control method are implemented by the gateway GW by executing a set 502 of sub-steps.

In a first sub-step 504 a burst transmitted via the RACH channel is received and demodulated by the receiver of the gateway GW, into which a demodulator is integrated.

Next in a second sub-step 506, a check verifies whether the burst received is empty or not. A burst is considered to be empty if at least the estimated power of the received signal is less than or equal to a first minimum threshold Th1 without being able to detect a waveform of a useful burst signal.

When the burst received is considered to be empty, in a third sub-step 508 a counter of the number of empty bursts Ne, initialized to zero at the start of the observation period, is incremented by one unit.

When a burst is considered to be non-empty, a check verifies in a fourth sub-step 510 whether the burst received has been received correctly, that is to say whether the burst has not undergone any collision. The reception and the demodulation of a non-empty burst are considered to be successful if at least the estimated power of the received signal is greater than or equal to a second threshold Th2 with a correct Unique Word UW (the unique word being a fixed pattern of data, placed at the start of a burst, or even a data pattern spread within the burst, and serving for synchronization), the second threshold Th2 being markedly greater than the first threshold Th1.

When the reception of the burst is considered to be successful, the processing of the burst is continued in a fifth sub-step 512 and in a sixth sub-step 514, a counter of the number of correctly received bursts Ns, initialized to zero at the start of the observation period, is incremented by one unit.

When the burst is considered to have undergone a collision, another processing is implemented in a seventh sub-step 516.

In an eighth step 518, immediately subsequent to the third sub-step 508 or the sixth sub-step 514, a check verifies whether the end of the observation period Tobs is reached. The observation period is a multiple of the duration of a frame and is equal to at least the duration of a frame.

When the end of the observation period is reached, the value Ne of the first counter is the number of empty bursts observed during this observation period and the value Ns of the second counter is the number of successfully received bursts observed during this observation period. The whole number N will subsequently designate the number of bursts available during this observation period.

When the end of the observation period is reached, a ninth processing sub-step 520 of updating the composition information and/or of stream control of the RACH channel is executed.

Next, a tenth sub-step 522 is executed in the course of which the first and second counters Ne, Ns are reinitialized by setting them to zero and a connection between the first and second sub-steps 504, 506 after a timeout to launch a new observation window.

When the end of the observation period is not yet reached, in an eleventh sub-step 524, the observation window remains open and no particular action is triggered on this absence of event.

The numbers of bursts metered Ne, Ns, N will allow the estimation of the respective probabilities Pe, Ps during the execution of the ninth sub-step 520. The set 520 of sub-steps for implementing the method of dynamically adapting the RACH channel at the level of the gateway differs from a conventional method for processing the bursts at the level of the gateway GW in that the set 520 comprises the sub-steps 506, 508, 514, 518, 520, 522, these latter being depicted by a greyed pattern and unbroken boundaries.

Figure 14:
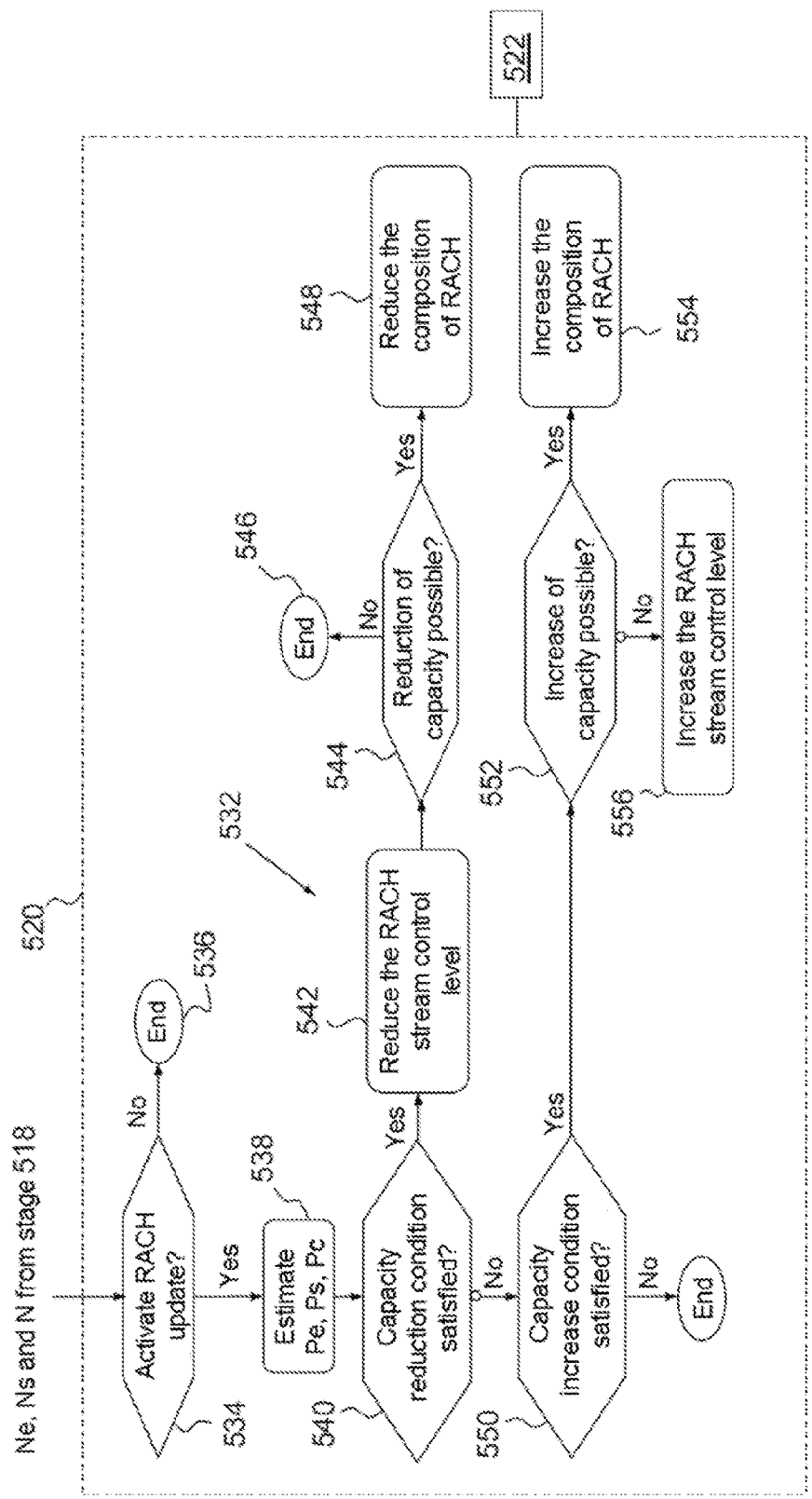
FIG. 14 is a flowchart of a second part of the processing implemented by the processing unit of the gateway GW, the second part describing in detail the last two steps of the first part of FIG. 13 as well as the coupling of the updating of the capacity and the setting up of the stream control.

According to FIG. 14, the ninth step 520 comprises a set 532 of sub-steps.

In a twelfth sub-step 534, compliance with a minimum period between two successive updates of the composition of the RACH channel is verified. This minimum period is required so as to stabilize the estimations of the probabilities Pe, Ps and Pc or of the estimation of the external loading at input G which must be representative of the updating of the channel composition associated with the most recent notification; otherwise the current estimations will be erroneous with measurements applicable to the channel composition according to the previous notification. The minimum period is at least equal to the maximum of the time taken from among the temporal length of the filter (observation period) and the path time of the notification of change of channel composition and of its being taken into account by the user terminals.

When the minimum period has not yet elapsed, the thirteenth sub-step 536 prohibits any action of updating the composition of the RACH channel.

When compliance with the minimum period is verified, a processing to update the composition of the RACH channel is authorized and a fourteenth sub-step 538 is executed in the course of which the probabilities Pe, Ps, Pc or the external input loading are estimated.

The probabilities Pe and Ps are estimated and calculated as being equal respectively to the ratios Ne/N and Ns/N.

The probability Pc is calculated using the expression Pc~1−(Pe+Ps). In all strictness the relation: Pc+Pe+Ps+PBR=1 is satisfied in which the probability PBR ("Probability of Burst Error") is the probability of a bursts error caused mainly by noise-dependent conditions of the channel. However the probability PBR is generally very low relative to the values of the thresholds of Pe or Pc or for estimation of G which are used for updating the capacity. Consequently the approximation Pc~1−(Pe+Ps) is permitted.

A simple filter is used to smooth the abrupt variations of the variations of Pe, Ps (moving average, first-order exponential), the length of the filter being linked with the reaction time. More sophisticated extrapolation filters can also be used.

Next, in the fifteenth sub-step 540, a check verifies whether the criterion of a decision to decrease the capacity of the RACH channel is fulfilled.

When the condition or conditions of the criterion to decrease the capacity of the RACH channel are fulfilled, in a sixteenth sub-step 542, the gateway decreases a level of stream control of the RACH channel by one unit. The stream control mechanism provides and uses a list indicating the classes of terminals which are or are not authorized to send. The level of stream control is the total number of blocked classes, that is to say which are not authorized to send. A reduction in the level of the stream control consists in authorizing a class previously prohibited to send again, this authorized class being randomly drawn from the list from among the set of prohibited classes. This mode of management makes it possible to guarantee equity between users.

Next, in a seventeenth sub-step 544, a check verifies whether the widening of the set of authorized classes performed in the previous step 542 does not call into question the decision to decrease the capacity of the RACH channel.

When the decision to decrease the capacity of the RACH channel is called into question, in an eighteenth step 546 the gateway GW notifies the terminals TE of the update information containing a composition of the channel identical to the previous composition and a list of authorized/blocked classes which is decreased in terms of blocked classes.

When it is considered possible to decrease the capacity of the RACH channel and the decision to decrease the capacity is confirmed, in a nineteenth step 548 the gateway GW notifies the terminals TE of the update information containing a new composition of the RACH channel for which the number N of the next applicable bursts is decreased, and a list of authorized/blocked classes decreased in terms of blocked classes.

When the condition or conditions of the criterion to decrease the capacity of the RACH channel are not fulfilled, in a twentieth sub-step 550 a check verifies whether the criterion of a decision to increase the capacity of the RACH channel is fulfilled.

When the condition or conditions of the criterion to increase the capacity of the RACH channel are fulfilled, in a twenty first sub-step 552, a check verifies whether it is possible to implement the decision to increase the capacity of the RACH channel, that is to say that a predetermined maximum capacity of the channel has not been exceeded.

If it is possible to increase the capacity of the RACH channel a twenty second sub-step 554 is executed in which the gateway GW notifies the terminals TE of the update information containing a new composition of the RACH channel for which the number N of the next applicable bursts is increased, the list of authorized/blocked classes remaining unchanged.

If it is deemed impossible to increase the capacity of the RACH channel because of the fact that the maximum capacity of the RACH channel has been reached, a twenty third sub-step 556 is executed in which the gateway decreases the level of stream control of the RACH channel by one unit. An increase in the level of the stream control consists in prohibiting a previously non-prohibited class from sending, this prohibited class being drawn randomly from the list of the classes from among the set of authorized classes. This mode of management makes it possible to guarantee equity between users. In the same twenty third sub-step 556, the gateway GW notifies the terminals TE of the update information containing the unchanged previous composition of the RACH channel and the list of authorized/blocked classes increased in terms of blocked classes. The level of stream control and the list updating are encoded on a few bits so as to allow frequent repetition of the notifications using a signalling channel of low capacity.

Figure 15:
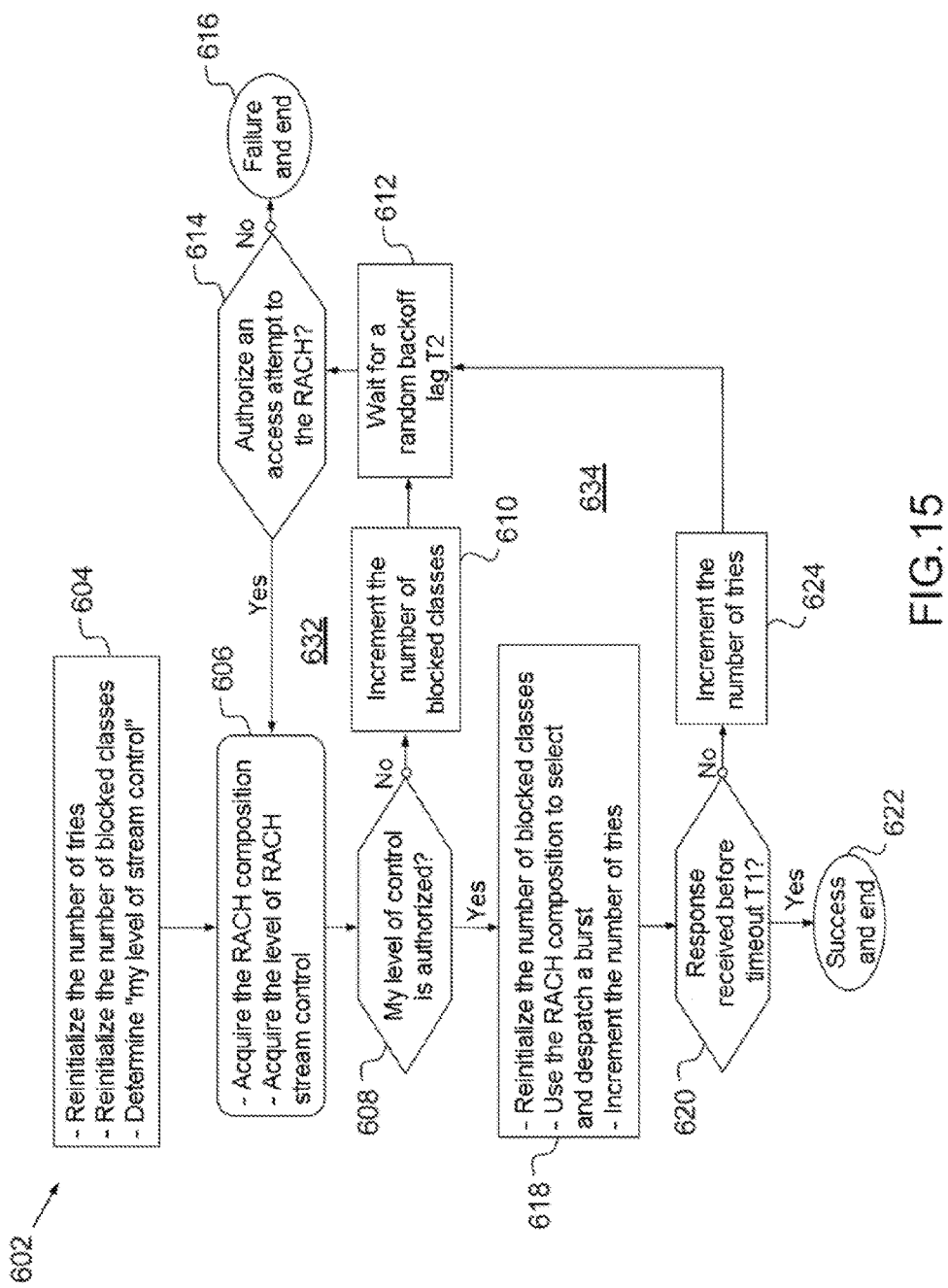
FIG. 15 is an exemplary flowchart of the processing implemented by the processing unit of a user terminal TE making it possible to carry out the method of dynamically adapting the capacity of FIG. 2 and the transmission method of FIG. 12, the stream control mechanism included, as well as the congestion control mechanism.

According to FIG. 15, steps 104, 106, 110, 112 of the method of dynamically adapting the capacity of the RACH channel, the stream control method 404, and congestion control method 410 are implemented at the level of each terminal TE by a set 602 of sub-steps.

In a first sub-step 604, a counter of tries or attempts Nb_tr is initialized a first time or reinitialized by the terminal TE considered and a counter of blocked classes Nb_blk of terminals is initialized a first time or reinitialized by the terminal TE considered. In the same sub-step 604, the terminal TE considered randomly draws a local-class index number "My Level" included in the total list of possible classes.

Next, in a second sub-step 606, the terminal TE acquires on the return pathway signalling channel the updated composition of the RACH channel and acquires the updated list of authorized classes and the level of stream control.

Next, in a third sub-step 608, the terminal TE verifies whether the randomly drawn local-class index number "My Level" is authorized, that is to say whether this index number corresponds to an authorized class in the last list of authorized classes which was notified by the gateway and acquired by the terminal TE.

When the local-class index number "My Level" of the terminal is not authorized, a fourth sub-step 610 is executed in the course of which the number of blocked classes Nb_blk is incremented by one unit.

Next, in a fifth sub-step 612, the transmission method is suspended during a lag or a backoff timeout T2 whose value is randomly determined according to a predetermined drawing law.

Typically, the drawing law is a law of binary exponential backoff (BEB) type, parametrizable as a function of the current level of stream control, and known for its good performance in spreading possible collisions of bursts using a contention channel.

Thereafter, in the course of a sixth sub-step 614, a check verifies whether a multicriterion condition for continuing the transmission method is or is not fulfilled. This condition is fulfilled if first, second, third criteria are cumulatively satisfied.

The first criterion requires that the number of tries Nb_tr is less than or equal to K, K designating the maximum number of retransmissions of bursts.

The second criterion requires that the number of blocked classes Nb_blk is less than or equal to the current number of unauthorized classes.

The third criterion requires that the total elapsed duration of the method 602, including the sum of the time to acquire the information relating to the composition and the stream control of the RACH channel, the backoff timeout T2 and a standby timeout T1 waiting for an acknowledgement of receipt of a burst dispatched to the gateway is less than a predetermined maximum duration.

If the multicriterion condition of the sixth sub-step 614 is not fulfilled, in a seventh sub-step 616 access to the network is refused and the user is notified of this refusal via the terminal.

If the multicriterion condition of the sixth sub-step 614 is fulfilled, the second sub-step 606 and the consecutive third sub-step 608 are executed.

When the local-class index number "My Level" of the terminal is authorized, an eighth sub-step 618 is executed in the course of which the number of blocked classes Nb_blk is reinitialized, and a burst is sent on a transmission resource authorized in accordance with the last composition received of the RACH channel. In the same eighth sub-step 618, the counter of tries Nb_tr is incremented by one unit.

Next, in a ninth sub-step 620, a check verifies whether an acknowledgement of the burst dispatched in the eighth sub-step 618 has been received before the standby timeout T1.

If an acknowledgement attesting successful receipt of the burst has been received by the terminal TE, in a tenth sub-step 622 the method 602 is terminated or continued by the transmission of a new packet or packet fragment.

If an acknowledgement of receipt of the burst is not received in the lag, an eleventh sub-step is executed in the course of which the counter of tries Nb_tr is incremented by one unit, followed by the execution of the fifth sub-step 612.

For example, a law of binary exponential backoff BEB type, parametrizable as a function of the current level of stream control is defined hereinbelow for a maximum of ten stream control classes and a current level of stream control or of blocked classes lying between 0 and 10.

T2 is a random drawing of a whole number of frames lying between 1 and $T2_{MAX}$.

$T2_{MAX}$ is defined by the relation $T2_{MAX}=[T2_{MIN}+MIN(2^R, M)]*S$ in which:

$T2_{MIN}$ designates a minimum interval of frames, typically equal to 4,

M designates a maximum number of frames, typically equal to 8,

R designates a number greater than or equal to 1 of retransmission attempts,

L designates the current number of blocked classes reflecting the current level of congestion, and S designates an expansion factor taking account of the congestion level such as $S=1+L/4$.

The values of M and S are evaluated by simulation so as to minimize the success times and to minimize the probability of system unavailability.

In this example, S=1, 2 or 3 demonstrate a "zero/low", "medium" or "high" congestion rate allowing spreading of the drawing of T2 having a bound $T2_{MAX}$=12, 24, 36.

It should be noted that sub-steps 606, 608, 610, 612, 614 define a first loop 632, conditioned by sub-steps 608, 614 and corresponding to the implementation by the terminal TE of the stream control mechanism.

Sub-steps 606, 608, 618, 620, 624, 612, 614, 606 define a second loop 634, conditioned by sub-steps 608, 620, 614 and corresponding to the implementation by the terminal TE of the congestion control mechanism.

The method of dynamically adapting the capacity of the RACH channel according to the invention, with a possible coupling of a stream and/or congestion control mechanism makes it possible to avoid reserving and immobilizing transmission resources (essentially one or more frequency bands) over long durations, greater than or equal to a minute, as is the case for updates executed by scheduling or by other equivalent means.

The method of dynamically adapting the capacity of the RACH channel according to the invention makes it possible to obtain typical times of real-time updating of the capacity of the RACH channel of less than or equal to a second, and considerably less than the long durations.

The method of dynamically adapting the capacity of the invention makes it possible to reserve just the minimum band required to boot the first entries into the network.

The adaptation in quasi-real-time of the capacity of the channel by adding/removing transmission resources (time slots or carriers) allows optimization of the useful frequency plan.

Furthermore, the method of dynamically adapting the capacity requires very little processing time, independently of the physical entity which executes it (a satellite with onboard processing or a terrestrial station with ground processing), the complexity of the processing being reduced.

Since the management of the resources for taking the capacity into account is similar to those existing in conventional access networks, the processing of the core of the algorithm of the method of the invention is simple, negligible in calculation time and easily achievable through software.

This processing implemented at the gateway level is mainly as follows:

the comparison with a minimum power threshold so as to declare an empty burst as output from the demodulator and then accumulation in counters (Ne, Ns) over a period (at least 1 frame);

the calculation of the output of a filter (by sliding average for example)

the comparison of the output of the filter with respect to a threshold so as to increase or decrease the required capacity, and/or put in place the stream control.

The order of complexity of this algorithm is O(N), N being the number of bursts configured per frame at a given instant in "contention" mode in the demodulator and with a constant processing time per outbound burst received.

The processing added at the level of the user terminals is also simple, requires negligible calculation times and is easily achievable through software.

The invention is applicable to any satellite(s) communications system, to any cellular or similar communications system which requires a slotted contention channel invoked spontaneously on a link or upgoing.

It should be noted that even if the above-described performance of the invention is that of slotted contention access protocols, that is to say synchronous, the method of the invention described hereinabove is also applicable when the asynchronous contention (non-slotted) access protocols are used, such as for example the ESSA (Enhanced Spread Spectrum ALOHA) protocol and the SMIM ("S-band Mobile Interactive MultiMedia") protocol.

The invention claimed is:

1. A method for dynamically adapting a capacity of a contention transmission channel using a predetermined access protocol, the channel being shared by a plurality of terminals (TE) forming a first network and defining an uppath from the terminals to a gateway (GW) of connection to a second network, the method comprising the following steps:

in a first step, fixing a value of an external loading desired as a nominal operating point of the channel, an actual external loading of the channel being equal to the current rate of new entrant terminals sending a respective burst of data on the channel;

in a second step, determining with the aid of a mathematical model or of a simulation, a first upper threshold $S_H$ and a second lower threshold $S_L$ of a quantity Gr monotonically sensitive to the actual external loading of the contention channel, the upper and lower external loadings of the contention channel corresponding respectively to the first upper threshold $S_H$ and second lower threshold $S_L$, the sensitive quantity Gr depending on a first probability of receiving an empty burst Pe, or on a pair of the first probability Pe and of a second probability of successfully receiving a burst Ps, or on a third probability of a burst having undergone a collision Pc, and on the type and on parameters defining the contention access protocol;

in a third step, estimating continuously over an observation window of predefined width and on the basis of measurements in reception in the said observation window of expected bursts a first measured probability of receiving an empty expected burst Pe, or a pair of measured probabilities made up of the first measured probability Pe and a second measured probability of successfully receiving the burst Ps, or a third measured probability of the burst having undergone the collision Pc;

in a fourth step, determining a current measured sensitive quantity Gr as a function of the first measured probability Pe, or of the pair of measured probabilities Pe and Ps, or of the third measured probability Pc;

in a fifth decision-taking step, when a crossing of the first upper threshold $S_H$ by the current measured sensitive quantity Gr takes place once or several consecutive times while getting further away from the value of a quantity corresponding to the nominal external loading, increasing a current capacity of the transmission channel by releasing additional communication resources and by informing the terminals through a return pathway of a new composition of an increased-capacity transmission channel; and/or when the crossing of the second lower threshold $S_L$ takes place by the current measured sensitive quantity Gr once or several consecutive times while getting further away from the value of the quantity corresponding to the nominal external loading, decreasing the current capacity of the transmission channel by removing communication resources in terms of frequencies from among the transmission resources currently made available and by informing the terminals through the return pathway of the new composition of a decreased-capacity transmission channel.

2. The method for dynamically adapting the capacity of the contention transmission channel according to claim 1, wherein the width of the observation window defining the observation time period is chosen to be sufficiently small to filter amplitudes of a noise of fast fluctuations of the probability or two probabilities estimated continuously and to allow suitable reactivity.

3. The method for dynamically adapting the capacity of the contention transmission channel according to claim 1, wherein the quantity Gr monotonically sensitive to the external loading of the contention channel is included in the set made up of the first measured probability of receiving the empty expected burst Pe;

the third measured probability of burst collision Pc;

the actual external loading G calculated on the basis of the first measured probability of receiving the empty expected burst Pe and of a maximum number of retransmissions K.

4. The method for dynamically adapting the capacity of the contention transmission channel according to claim 3, wherein the third measured probability of burst collision Pc is either;

estimated directly on the basis of the measured number of bursts having undergone the collision that are observed in the observation window; or calculated on the basis of first measured probability of receiving an empty expected burst Pe and of the second measured probability of correctly receiving a burst Ps according to the expression:

$$P_c=1-(P_e+P_S).$$

5. The method for dynamically adapting the capacity of the contention transmission channel according to claim 3, wherein the external loading G is calculated for a slotted ALOHA (SA) channel on the basis of the expression:

$$G=-P_e*Ln(P_e)/[1-(1-P_e)^{K+1}]$$

where

Pe designates the first measured probability of receiving the empty expected burst, and K designates the maximum number of retransmissions.

6. The method for dynamically adapting the capacity of the contention transmission channel according to claim 1, wherein the first upper threshold $S_H$ and the second lower threshold $S_L$ of the sensitive quantity Gr are determined on the basis of a model representative of the protocol used by the contention channel to minimize errors in decisions regarding change of capacity, and stabilize the decisions regarding change of capacity, and ensure good temporal reactivity of change, and optimize a performance of the channel so as to avoid a collapse of the channel because of an overly large number of collisions.

7. The method for dynamically adapting the capacity of the contention transmission channel according to claim 1, wherein a decision $D_{up}$ is taken to increase the capacity of the channel when the crossing of the first upper threshold $S_H$ from above has taken place a first number $N_{up}$ of consecutive times, and/or a decision $D_{down}$ is taken to decrease the capacity of the channel when the crossing of the second lower threshold $S_L$ has taken place a second number $N_{down}$ of consecutive times from above, the first number $N_{up}$ being a smallest whole number greater than or equal to two such that:

$$(1-D_{up})^{N_{up}} \leq P_{up\_res} \text{ where}$$

$D_{up}$ designates the probability of a good decision when the upper threshold has been crossed from below once and $P_{up\_res}$ a first predetermined residual probability of bad decision, and the second number $N_{down}$ being the smallest whole number greater than or equal to two such that:

$$(1-D_{down})^{N_{down}} \leq P_{down\_res} \text{ where}$$

$D_{down}$ designates the probability of the good decision when the lower threshold has been crossed from above once and $P_{down\_res}$ a second predetermined residual probability of bad decision.

8. The method for dynamically adapting the capacity of the contention transmission channel according to claim 7, wherein the second number of consecutive crossings $N_{down}$ is markedly greater than or equal to the second number of consecutive crossings $N_{up}$ in a ratio $N_{down}/N_{up}$ greater than or equal to 5, preferably greater than or equal to 10.

9. The method for dynamically adapting the capacity of the contention transmission channel according to claim 1, wherein the decided increasing and/or decreasing of capacity of the channel is performed by following in a way one and a same profile of growth and decrease of the capacity in stages or by degrees.

10. The method for dynamically adapting the capacity of the contention transmission channel according to claim 1, wherein the contention access protocol used by the channel is included in a slotted set of contention protocols made up of a time-segmentation or slotted ALOHA protocol and its derivatives combining a capture effect (CE) and/or an effect of using (temporal or frequency) diversity and access conflict resolution CRD (Contention Resolution Diversity).

11. The method for dynamically adapting the capacity of the contention transmission channel according to claim 1, further comprising an initialization step in a course of which at an instant of booting the current capacity of the transmission channel is set to a predetermined initial capacity value.

12. The method for dynamically adapting the capacity of the contention transmission channel according to claim 11, wherein the initial capacity is an arbitrarily fixed average capacity at a minimum equal to a burst every N whole frames.

13. A method for transmitting data packets or fragments of packets in the form of bursts through a contention transmission channel, shared by a plurality of terminals forming a first network and defining an uppath from the terminals to a gateway for connection to a second network, the said transmission method comprising another method of dynamically adapting the capacity of the transmission channel, defined according to claim 1 and a stream control method coupled with the said method of dynamically adapting the capacity, the stream control method comprising the following steps:

in a sixth step providing a current list of classes of terminals distinguishing the classes of terminals authorized to send and the classes of terminals that are prohibited from sending, in a seventh step, when the crossing of the upper threshold $S_H$ prompts a decision to increase the capacity of the channel and when a predetermined maximum size of the channel is reached, triggering an increase in the level of stream control while prohibiting a class of terminals, authorized to send of the current list and chosen randomly, from sending, and in the same seventh step, when the crossing of the lower threshold $S_L$ prompts a decision to decrease the capacity of the channel, triggering a reduction in the level of stream control while authorizing a class of terminals, prohibited from sending of the current list and chosen randomly, to send.

14. The method of transmitting according to claim 13, comprising a congestion control method, coupled with the stream control method and wherein the spreading of lags of the terminals authorized to send is an increasing function of the level of stream control.

15. A system for transmitting in the form of bursts of data packets or fragments of packets through a contention transmission channel, comprising a plurality of terminals forming a first network, and a gateway for connection to a second network, the connection gateway being configured:

to receive in the form of bursts data packets or fragments of packets sent by the terminals on a contention uppath transmission channel, and to dynamically adapt the capacity of the said contention uppath transmission channel as a function of a traffic of entrant terminals, the said transmission system such that the connection gateway is configured to estimate continuously over an observation window of predefined width and on the basis of measurements performed in reception in the said observation window of the bursts a first probability of receiving an empty expected burst $P_e$, or a pair of probabilities made up of the first probability Pe and a second probability of correctly receiving a burst $P_s$, or a third probability of burst collision $P_c$;

determine a current quantity Gr monotonically sensitive to an external loading of the contention channel on the basis of the first estimated probability Pe or the pair of probabilities made up of the first estimated probability Pe and the second estimated probability of receiving the correct burst $P_s$, or the third probability of receiving the burst having undergone the collision of the burst $P_c$; and then when a crossing of a first upper threshold $S_H$ by the current quantity Gr takes place once or several consecutive times while getting further away from a value of the quantity corresponding to a nominal external loading, increase a current capacity of the transmission channel by releasing additional communication resources in terms of additional frequencies and by informing the terminals through a return pathway of the new composition of an increased-capacity transmission channel; and/or when the crossing of the second lower threshold $S_L$ by the current quantity takes place once or several consecutive times while getting further away from the value of the quantity corresponding to the nominal external loading, decrease the current capacity of the transmission channel by removing communication resources in terms of frequencies from among the transmission resources currently made available and by informing the terminals through the return pathway of the new composition of an decreased-capacity transmission channel.

16. The system for transmitting data packets or fragments of packets according to claim 15, wherein the connection gateway is configured to implement a stream control mechanism consisting in providing a current list of classes of terminals distinguishing the classes of terminals authorized to send and the classes of terminals that are prohibited from sending, and when the crossing of the upper threshold $S_H$ by the current quantity Gr prompts a decision to increase the capacity of the channel and when a predetermined maximum size of the channel is reached, triggering an increase in a level of stream control while prohibiting a class of terminals, authorized to send of the current list and chosen randomly, from sending, and when the crossing of the lower threshold $S_L$ by the current quantity Gr prompts a decision to decrease the capacity of the channel, triggering a reduction in the level of stream control while authorizing a class of terminals, prohibited from sending of the current list and chosen randomly, to send.

* * * * *